US006842278B1

(12) United States Patent
Sakamaki et al.

(10) Patent No.: US 6,842,278 B1
(45) Date of Patent: Jan. 11, 2005

(54) METHOD FOR MANUFACTURING IMAGE DISPLAYING MEDIUM

(75) Inventors: Motohiko Sakamaki, Nakai-machi (JP); Kiyoshi Shigehiro, Nakai-machi (JP); Yoshiro Yamaguchi, Nakai-machi (JP); Shota Oba, Nakai-machi (JP); Nobuyuki Nakayama, Nakai-machi (JP); Yoshinori Machida, Nakai-machi (JP); Minoru Koshimizu, Nakai-machi (JP); Takeo Kakinuma, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 449 days.

(21) Appl. No.: 09/619,606

(22) Filed: Jul. 19, 2000

(30) Foreign Application Priority Data

Jul. 21, 1999 (JP) .......................................... 11-205722
May 31, 2000 (JP) ....................................... 2000-162356

(51) Int. Cl.[7] .......................... G02B 26/00; G09G 3/34; G03G 17/04; H04N 3/36

(52) U.S. Cl. ......................... 359/296; 345/107; 345/31; 430/38; 430/45; 430/496; 204/606; 348/106

(58) Field of Search ............................ 359/296; 345/31, 345/85, 105, 107; 430/38, 45, 496, 258; 348/106; 204/606, 600, 450; 349/155

(56) References Cited

U.S. PATENT DOCUMENTS 2,940,847 A * 6/1960 Kaprelian
3,870,517 A * 3/1975 Ota et al. ...................... 96/1.5
5,558,977 A * 9/1996 DePalma et al. ........... 430/496
6,392,786 B1 * 5/2002 Albert ........................ 359/296
6,636,186 B1 * 10/2003 Yamaguchi et al. .......... 345/31
6,672,921 B1 * 1/2004 Liang et al. .................. 445/24

OTHER PUBLICATIONS

Jo et al., "New Toner Display Device (I)—Image Display Using Conductive Toner and Charge Transport Layer—"; Japan Hardcopy '99 Proceedings, 1999, pp. 249–252.
Jo et al., New Toner Display Device (II):, Japan Hardcopy '99 Fall Meeting Proceedings, 1999, pp. 10–13.
Kitamura et al., "Toner Display by Electrical Movement of Conductive Toner", The Institute of Image Information and Television Engineers, Technical Report vol. 24, No. 16, 2000, pp. 7–11.
Kawai et al., "Microcapsule–type Electrophorectic Display (MC–EPD)", Japan Hardcopy '99 Proceedings, 1999, pp. 237–240.
Kawai, "Development of Microcapsule–type Electrophorectic Display (digital Paper)", The Imaging Society of Japan, Electronic Imaging Seminar, 1999, pp. 31–36.

* cited by examiner

*Primary Examiner*—Loha Ben
(74) *Attorney, Agent, or Firm*—Oliff & Berridge, PLC

(57) ABSTRACT

A method for manufacturing an image displaying medium is provided in that a display element in the form of powder can be filled between facing substrates. After patterning spacer particles on a first flat substrate supplied from a first film roller set on a first roller shaft by a first electrostatic coating device, they are fixed by a first fixing device to form a spacer on the first flat substrate, and then black particles are coated, on the entire surface by a second electrostatic coating device. After coating white particles thereon by a third electrostatic coating device, the black particles and the white particles on the upper part of the spacer are removed by a blade, and a second flat substrate supplied from a second film roller set on a second roller shaft is superimposed, followed by fixing the upper part of the spacer and the second flat substrate by a second fixing device.

26 Claims, 21 Drawing Sheets

FIG.23A
FIG.23B
FIG.23C
FIG.23D
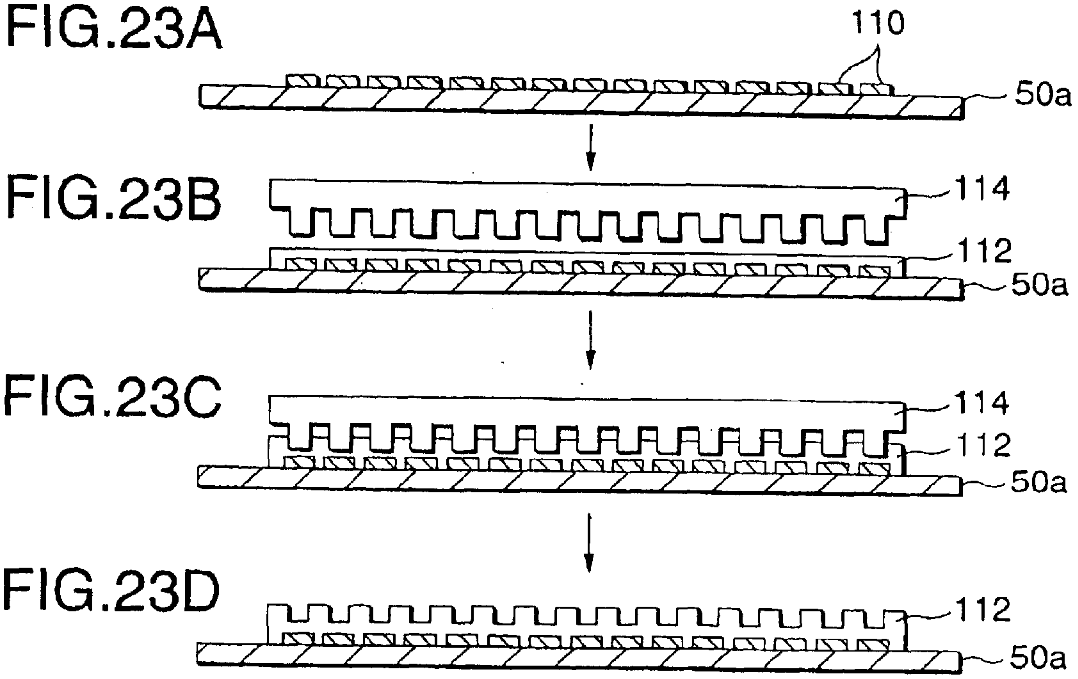
FIG.24
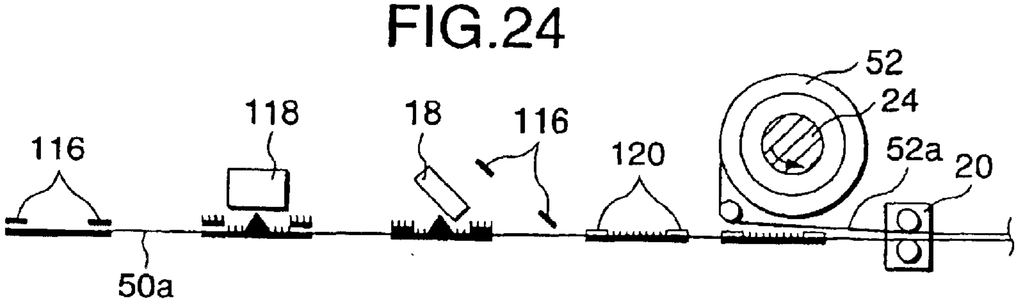
FIG.25
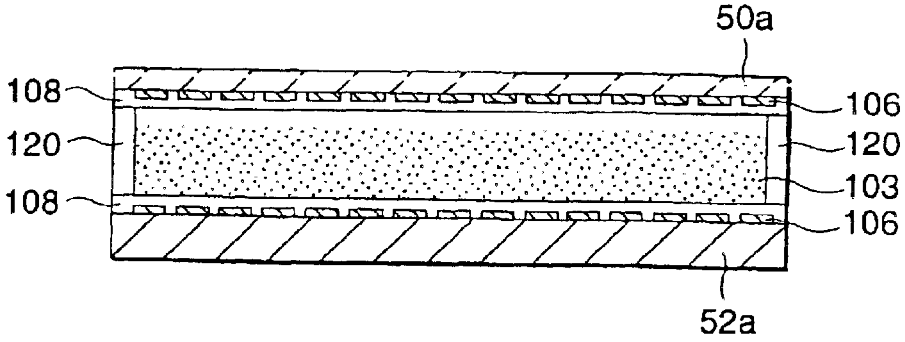

METHOD FOR MANUFACTURING IMAGE DISPLAYING MEDIUM

BACKGROUND OF THE INVENTION

1. Field of the Invention

The present invention relates to a method for manufacturing an image displaying medium, and in particular, it relates to a method for manufacturing an image displaying medium that can display an image repeatedly.

2. Discussion of the Related Art

Electronic paper technique has been known in that a desired image is displayed on a display substrate by utilizing an electronic action. The electronic paper technique includes, as roughly classified, two constitutions, one of which has such a structure that a liquid display element or a displaying liquid of a display element dispersed in a liquid is filled between substrates that face each other, such as those utilizing electrophoresis, thermal rewritable, liquid crystal and electrochromy, and the other of which has such a structure that a display element having a powder form is filled between substrates that face each other, such as a structure shown in, FIG. 20, in which a conductive colored toner 96 and white particles 98 are filtered between two display substrates 90*a* and 90*b*, each of which is formed by accumulating a matrix electrode 92 and a charge transporting layer 94.

A method for manufacturing electronic paper of the former technique in which a liquid display element or a display liquid of a display element dispersed in a liquid is filled between facing substrates has been known. For example, a liquid crystal display is manufactured by sucking a gap between the substrates to fill the liquid display element or the display liquid of a display element dispersed in a liquid.

However, a manufacturing method for electronic paper of the latter technique, in which a display element in a powder form, such as a toner, is filled between the facing substrates, has not yet been known. It is considered that the electronic paper of this type can be manufactured by sucking a gap between the substrates to fill the powder dispersed in a dispersion medium between the substrates, and then the dispersion medium is evaporated. However, it is difficult to completely evaporate the dispersion medium filled between the substrates, and thus the method cannot be practically conducted.

SUMMARY OF THE INVENTION

Under the circumstances, the invention provides a method for manufacturing an image displaying medium in that a display element in a powder form can be uniformly filled between substrates facing each other.

The invention relates to, as a first aspect, a method for manufacturing an image displaying medium containing the steps of: providing plural colorant particles on at least one of a first flat substrate and a side of a second substrate, on which plural spacers a provided to maintain a constant distance to the first substrate upon superimposing on the first substrate; and fixing the first substrate and the plural spacers on the second substrate to arrange the colorant particles between the first substrate ad the second substrate.

In the first aspect of the invention, under the condition in that the colorant particles are provided on the first substrate or the spacer side of the second substrate, or on both the find substrate and the spacer side of the second substrate the first substrate and the spacers of the second substrate are fixed to uniformly fill the colorant particles between the facing substrates.

Particularly, in the case where two kinds of colorant particles having different charging characteristics are used, it is preferred that the colorant particles having one kind of characteristics are adhered on the first substrate, and the colorant particles having the other kind of characteristics are adhered on the spacer side of the second substrate.

That is, in the first aspect of the method for manufacturing an image displaying medium, because the first substrate and the spacers of the second substrate are fixed, the distance between the first substrate and the second substrate is maintained at a constant distance. Furthermore, because the colorant particles are maintained on at least one of the substrates, there is no possibility of causing problems, for example, in that the amounts of the colorant particles filled between the first substrate and the second substrate are different per the regions, for example, to cause a region having no coloring agent particle filled therein, and thus the colorant particles can be uniformly filled in all the regions.

As a method for providing the colorant particles on the substrate, the following method can be employed. For example, methods utilizing an electrostatic recording method can be employed, in which the colorant particles are charged, and the charged colorant particles are directly provided on the substrate having an electrostatic latent image formed on the surface thereof, or in alternative, the charged colorant particles arm provided on an intermediate transfer material having an electrostatic latent image formed on the surface thereof, and the charge colorant particles are transmitted from the intermediate transfer material to the substrate. The colorant particles can be coated to a desired pattern by utilizing an electrophotographic method, a method using a multi-stylus electrode, a liquid development method and an electrostatic coating method as the electrostatic recording methods A method of simply supplying the colorant particles to the substrate to be held thereon can also be employed as another method. The method of the type includes a screen printing method, a blade coating method, a roller coating method, a spray coating method, a gap coating method and a bar coating method, and a coloring agent particle layer can be coated on the substrate by using the methods.

It is also possible to use a method, in which the colorant particles are suspended in a space by air blowing, and the substrate passes trough the space for a prescribed period of time, so as to form a uniform coloring agent particle layer on the substrate by precipitation of the colorant particles.

It is also possible to use a method, in which by using colorant particles having a magnetic material therein, the colorant particles are directly provided on a substrate having a magnetic pattern formed on the surface thereof, or in alternative, the colorant particles are provided on an intermediate transfer material having a magnetic pattern formed on the surface thereof, and then the colorant particles are transferred from the intermediate transfer material to the substrate to be held thereon. The colorant particles can be coated to a desired pattern utilizing a magnetography method as the magnetic recording method.

Furthermore, it is possible that the colorant particles are dispersed in a dispersion medium and adhered on the surface of the substrate, and the dispersion medium is evaporated, whereby only the colorant particles remain on the substrate to be provided thereon. In such a method, the colorant particles can be coated on the substrate by a screen printing method, a blade coating method, a roller coating method, a spray coating method, a gap coating method or a bar coating method or by using a liquid spraying device, such as an ink jet device, and then it is dried to evaporate the dispersion medium, so as to uniformly coat a coloring agent particle layer on the substrate.

Furthermore, it is also possible that after directly supplying the colorant particles to the substrate, the colorant particles on the substrate is uniformized by vibrating the substrate, so as to be held on the substrate. In such a method, after subjecting the colorant particles to cascade development on the substrate, the colorant particles are uniformly smoothened by vibrating the substrate to form a layer, whereby a uniform coloring agent particle layer can be coated on the substrate. The method where vibration is applied is also useful in the screen printing method, the blade coating method, the roller coating method, the spray coating method, the gap coating method, the bar coating method and the particle sedimentation method.

Furthermore, it is also possible that the colorant particles are coated on the substrate having a volatile liquid coated in a desired pattern, so as to provide the colorant particles on the substrate in the desired pattern. In such a method, the colorant particles are supplied, by a screen printing method, a blade coating method, a roller coating method, a spray coating method, or a particle sedimentation method, to the substrate having a volatile liquid coated in a desired pattern, so as to adhere the colorant particles, and then excess particles on the area other than the pattern are blown away by air, followed by evaporating the volatile liquid, whereby the coloring agent particle layer can be coated on the substrate in a desired pattern.

Furthermore, it is also possible that a mask having an opening having a desired pattern is placed on the substrate, and after supplying the particles, the mask is removed to provide the particles on the substrate in the desired pattern. In such a method, the particles are supplied by a screen printing method, a blade coating method, a roller coating method, a spray coating method, a gap coating method, a bar coating method or a particle sedimentation method, to the substrate, on which the mask having an opening with a desired pattern is placed, and then the mask is removed, whereby the coloring agent particle layer can be coated on the substrate in a desired pattern.

The spacers of the second substrate can be formed by cutting the surface of the flat substrate by a cutting tool or laser, or in alternative, by patterning utilizing a sand blast process or a lithography technique.

Furthermore, a spacer base material is injected in a mold having a mold surface in the spacer pattern formed thereon, followed by solidifying, or the second substrate is formed by hot press, whereby the second substrate having the spacers. In such a method, a mold having a desired pattern is previously formed by a microfabrication technique such as discharge working, and an action curing resin, such as an ultraviolet ray curing resin, a visible ray curing resin and an electron beam curing resin, is cured by an ultraviolet ray, a visible ray or an electron beam, or in alternative, a thermoplastic resin is formed by hot press, followed by cooling to be cured, whereby the spacers can be formed into a fine pattern by a manufacturing method suitable for mass manufacturing, so as to realize high resolution of the displayed image.

Furthermore, the spacers of the second substrate can be formed by fixing the spacers arranged on the flat substrate.

For example, the spacer particles are dispersed in an adhesive dispersion medium to form a dispersion fluid, and the dispersion fluid is sprayed by a liquid spraying device, such as an ink jet device, on the flat substrate, so as to fix the spacer particles on the substrate by the adhesive force of the dispersion medium to form the spaces. Alternately, the spacer particles art dispersed in a volatile dispersion medium and supplied to the flat substrate having a fixing layer formed thereon, and then the dispersion medium is evaporated to fix the spaces by the fixing force of the fixing layer.

The fixing layer is an adhesive layer formed of an adhesive material, a thermoplastic resin layer that is plasticized by heating, or an action curing resin. Examples of the action curing resin include an ultraviolet ray curing resin that is cured by an ultraviolet ray, a visible ray curing resin that is cured by a visible ray, and an electron beam curing resin that is cured by an electron beam.

In the case where the fixing layer is formed of a thermoplastic resin, the dispersion medium is evaporated, and then the thermoplastic resin is plasticized by heating, followed by cooling, so as to fix the spacer particles on the second substrate. According to the method, the substrate having the spacers can be manufactured by a simple process at a low cost.

Furthermore, in the case where the fixing layer formed on the substrate is formed of an action curing resin, the dispersion medium is evaporated, and then the resin is cured by a visible ray, an ultraviolet ray, heat or an electron beam, so as to fix the spacer particles on the second substrate.

Furthermore the spacers can be formed by the following manner. Spacer particle having a fixing layer formed on the surface thereof, or spacer particles formed of a thermoplastic resin or an action curing resin are supplied to a flat substrate, and the spacers can be fixed by the fixing force of the fixing layer formed on the surface of the spacer particles. As the fixing layer on the spacer particles, those for the substrate can also be applied.

It is also possible to use a method utilizing an electrostatic recording method, for example, the spacer particles are charged, and the charged spacer particles are directly provided on the substrate having an electrostatic latent image formed on the surface thereof, or in alternative, the charged spacer particles are provided on an intermediate transfer material having an electrostatic latent image formed on the surface thereof, and then the charged spacer particles are transferred from the intermediate transfer material to the substrate. The spacer particles can be coated in a desired pattern by using an electrophotographic method, a method using a multistylus electrode, a liquid development method or an electrostatic coating method, as the electrostatic recording method.

The fixing layer is a layer of a thermoplastic resin, which is plasticized by heating. The spacer particles can be fixed on the second particles by plasticizing the fixing layer by heating, and then cooling. According to the method, the substrate having the spacer can be manufactured by a simple process at a low cost.

Furthermore, the following methods can be used. By using spacer particles having a magnetic material therein, the spacer particles are directly provided on the substrate having a magnetic pattern formed on the surface thereof, or in alternative, the spacer particles arm provided on an intermediate transfer material having a magnetic pattern formed on the surface thereof, and the spacer particles are transferred from the in intermediate transfer material to the substrate. A magnetic material or an electromagnet having an arbitrary pattern formed therein is arranged on the back surface of the substrate, and after providing the spacer particles on the surface, the magnetic material is removed or the electromagnet is turned off. Furthermore, the spacer particles can be coated in a desired pattern by using a magnetography method as the magnetic recording method, and the spacer particles can be fixed on the substrate by the fig fore of the fix layer formed on the surface of the spacer particles. As the fixing layer on the spacer particles, those for the substrate can also be applied.

Furthermore, it is possible that the spacer particles are dispersed in a dispersion medium and adhered on the surface of the substrate, and the dispersion medium is evaporated, whereby only the spacer particles remain on the substrate to be provided thereon. In such a method, the spacer particles can be coated on the substrate by a screen printing method, a blade coating method, a roller coating method, a spray coating method, a gap coating method or a bar coating method or by using a liquid spraying device, such as an ink jet device, and then the spacer particles can be fixed on the substrate by the fixing force of the fixing layer formed on the surface of the spacer particles. As the fixing layer on the spacer particles, those for the substrate can also be applied.

Furthermore, it is also possible that the spacer particles are coated on the substrate having a volatile liquid coated in a desired pattern, so as to provide the spacer particles on the substrate in the desired pattern. In such a method, the spacer particles are supplied and adhered, by a screen printing method, a blade coating method, a roller coating method, a spray coating method or a particle sedimentation method, to the substrate having a volatile liquid coated in a desired pattern, so as to adhere the spacer particles, and then excess particles on the area other than the pattern are blown away, followed by evaporating the volatile liquid, whereby the spacer particle can be coated on the substrate in a desired pattern, and can be fixed on the substrate by the fixing force of the fixing layer formed on the surface of the spacer particles. As the fixing layer on the spacer particles, those for the substrate can also be applied.

Furthermore, it is also possible that a mask having an opening having a desired pattern is placed on the substrate, and after supplying the spacer particles, the mask is removed to provide the particles on the substrate in the desired pattern. In such a method, the particles are supplied, by a screen printing method, a blade coating method, a roller coating method, a spray coating method, a gap coating method, a bar coating method or a particle sedimentation method, to the substrate, on which the mask is placed, and then the mask is removed, whereby the spacer particles can be coated on the substrate, on which the mask having a desired pattern is placed, and can be fixed on the substrate by the fixing force of the fixing layer formed on the surface of the spacer particles. As the fixing layer on the spacer particles, those for the substrate can also be applied.

Furthermore, the spacers may be formed by subjecting a film formed of a thermoplastic resin to beat transfer using a thermal head or by applying an action to a film formed of an action curing resin. According to the methods, a desired pattern can be formed by working the substrate by hot press, and thus the spacers can be manufactured by a manufacturing method suitable for mass manufacturing. A resin having the spacer particles kneaded therein can be used as the thermoplastic resin.

It is also possible that a bar member having a thermoplastic resin layer on the surface thereof or a bar member formed of a thermoplastic resin is arranged on the flat substrate and formed by curing with heat, or in alternative, a bar member having a layer of an action curing resin or a bar member formed of an action curing resin is arranged on the flat substrate and formed by action curing. Furthermore, plural bar members may be used as they cross each other. As the thermoplastic resin and the action curing resin, those described in the foregoing can also be applied.

As the second substrate, a film formed by kneading the spacer particles in a polymer resin film to form unevenness on the surface thereof may be used. According to the method, adhesion with the first substrate can be conducted by filling particles in the concave parts, and coating a thermoplastic resin or an action curing resin on the convex parts.

The spacers maintain the distance between the first substrate and the second substrate and preferably has a lattice configuration or a inch-like configuration. By using the spa having a lattice configuration or a mesh-like configuration, a large number of cells are formed by dividing with the spacer between the first substrate and the second substrate, and thus the colorant particles can be prevented from building up at a part of the displaying medium upon actuating the display medium. It is also preferred that the color of the colorant particles is changed to realize multi-color display.

The member having a lattice configuration or a mesh-like configuration can be manufactured by opening holes in a metallic sheet, such as stainless steel, or a resin film, such as polyimide, by etching or laser working, by deposition forming of a metal, such as nickel using an electrocasting method, or in alternative, by knitting a metallic wire, such as stainless steel, or a resin, such as nylon, into a mesh-like configuration. The member may be coated with an insulating material, such as a resin, or with a thermoplastic resin for attaining an adhesive property.

In the method for manufacturing an image displaying medium of the invention, as a second aspect, it is preferred that upon providing the colorant particles on the second substrate, the colorant particles provided on an upper surface of the spaces are removed When the colorant particles are provided on the second substrate, the colorant particles are adhered on the entire surface of the second substrate including the upper surface of the spacers provided on the second substrate. Base the first substrate is fixed on the upper surface of the spacers, there is a possibility that the colorant particles attached on the upper surface of the spacers are fixed along with the first substrate.

When the colorant particles are fixed between the spacers and the first substrate, not only the adhesive property between the spacers and the first substrate is lowered, but also the colorant particles are always viewed from the outside when the side of the first substrate is used as the display surface, whereby the image quality is deteriorated. Therefore, the image quality can be improved by using the side of the second substrate as the display surface. Furthermore, by removing the colorant particles attached on the upper surface of the spacers, the adhesive property between the first substrate and the spacers can be improved, and even when the side of the first substrate is used as the display surface or the side of the second substrate is used as the display surface, the image quality is not deteriorated and an image can always be formed in good conditions.

As means for removing the colorant particles attached on the upper surface of the spacer, for example, a blade in contact only with the upper surface of the spacer is moved with respect to the second substrate, so as to remove the colorant particles attached on the upper surface of the spacers.

Because the amount of the colorant particles attached on the upper surface of the spacers is constant, by moving the blade with respect to the second substrate in one direction, the colorant particles removed from one spacer fall in one region divided by the spacer, and therefore the constant amount of the colorant particles is filled in the regions.

Furthermore, by smoothening the colorant particles with a blade, the colorant particles can be positively filled uniformly in the cell structure or the concave parts formed by the spacers. Specifically, a member having a mesh-like configuration is adhered on the second substrate as the spacer, and after coating the colorant particles, they are smoothened with a blade, whereby the colorant particles can be filled uniformly in the concave parts formed on the second substrate by the member having a mesh-like configuration. By changing the degree of elasticity of the blade, the follow-up property of the blade with respect to the mesh part can be controlled. By controlling the angle forming the blade and the mesh part and the force applied to the blade on the mesh part, the amount of the filled colorant particles can be finely controlled.

Furthermore, the excess colorant particles attached on the convex parts of the member having a mesh-like configuration can be removed.

The invention also relates to, as a third aspect, a method for manufacturing an image displaying medium containing the steps of: providing plural colorant particles on one or both of a first flat substrate and a second flat substrate, to provide a spacer member on one of the first substrate and the second substrate; and arranging the colorant particles and the spacer member between the first substrate and the second flat substrate by fixing the spacer member, the first substrate and the second substrate.

In this aspect, the colorant particles are uniformly filled between the facing two substrates, and it is not necessary to provide the spacer on the substrate by another step to simplify the process by the following manners. The plural colorant particles and the spacer member are provided on the first substrate, and the first substrate and the second substrate are fixed. The plural colorant particles are provided on the first substrate, the spacer member is provided on the second substrate, and the first substrate and the second substrate are fixed. At least one kind of colorant particles and the spacer member are provided on the first substrate, the balance of the colorant particles are retained on the second substrate, and, the first substrate and the second substrate are fixed. At least one kind of colorant particles are provided on the first substrate, the balance of the colorant particles and the spacer member are retained on the second substrate, and the first substrate and the second substrate are fixed.

In the method for manufacturing an image displaying medium of the invention, as a fourth aspect, it is preferred that the plural colorant particles and the spacer member are transferred to an intermediate transfer material, and then transferred from the intermediate transfer material to the first substrate to be provided thereon.

In the third and fourth aspects of the invention, as the method for providing the colorant particles and the spacer member, the following methods can be employed among those described for the first aspect of the invention.

The method of directly providing the charged colorant particles and the charged spacer member in a particle form (hereinafter referred to as spacer particles) on the substrate having an electrostatic latent image formed on the surface thereof, and the method of providing the charged colorant particles and the spacer particles on the intermediate transfer material having an electrostatic latent image formed on the surface thereof, and the charged colorant particles and the spacer particles are transferred from the intermediate transfer material to the substrate to be provided thereon can be employed. In the case where these methods are employed, the colorant particles and the spacer particles may be those described for the first aspect.

As another method using a magnetic recording method, it is possible to use a method, in which at least one kind of colorant particles and spacer particles having a magnetic material inside are used, and the colorant particles and the spacer particles arm directly provided on the substrate having a magnetic pattern formed on the surface thereof, and a method, in which at least one kind of colorant particles and spacer particles having a magnetic material inside are provided on an intermediate transfer material having a magnetic pattern formed on the surface thereof, and the colorant particles are transferred from the intermediate transfer material to the substrate to be provided thereon. In the case where these methods are employed, the colorant particles and the spacer particles may be those described for the first aspect.

In the fifth aspect of the method for manufacturing an image display medium of the invention, the method contains the steps of: under conditions where one of a first flat substrate and a second flat substrate is masked, providing plural colorant particles on one or both of the first flat substrate and the second flat substrate; after removing the mask, providing a spacer member on one of the first substrate and the second substrate; and arranging the colorant particles and the spacer member between the first substrate and the second flat substrate by fixing the spacer member, the first substrate and the second substrate.

In the fifth aspect of the invention, under the conditions where one of a first flat substrate and a second flat substrate is masked, for example, with a member having a mesh-like configuration, the plurality colorant particles are provided on one or both of the first flat substrate and the second flat substrate. After providing the colorant particles, the mask is removed, and the spacer member is provided on one of the first substrate and the second substrate. Thereafter, the spacer member, the first substrate and the second substrate arm fixed to arrange the colorant particles and the spacer member between the first substrate and the second flat substrate.

By providing the colorant particles under the conditions where the substrate is masked, the colorant particles can be provided only on the necessary part. As the method for providing the colorant particles, those described for the first aspect can be employed.

In the sixth, seventh and eighth aspects of the invention, which are based on the first, third and fifth aspects, respectively, the spacer member may be a member having a mesh-like configuration. According to these aspects, a cell structure can be conveniently formed.

In the ninth, tenth and eleventh aspect of the invention, which are based on the first, third and fifth steps respectively, the spacer member or an adhesive for adhering the spacer member may be an elastic material. According to these aspects, even when stress is applied to the first substrate and the second substrate in the vertical direction or in the horizontal direction, the substrates are difficult to be peeled off each other because the spacer member or the adhesive for adhering the spacer member expands and contracts.

In the twelfth, thirteenth and fourteenth aspects of the invention, which are based on the first, third and fifth aspects, respectively, the spacer member may be formed of a resin. For example, a resin is coated on the entire surface of the first substrate or the second substrate, followed by curing with beat, and then the resin is embossed by a mold having an uneven shape, whereby the resin functions as the spacer.

In the fifteenth aspect of the invention, the method contains the steps of: providing plural colorant particles on one or both of a first flat substrate and a second flat substrate, which have such shapes that the first substrate and the second substrate are mated each other, and mating the first substrate and the second flat substrate to fix the first substrate and the second substrate.

In the fifteenth aspect of the invention, the first substrate and the second substrate have the prescribed uneven shapes. Therefore, the first substrate and the second substrate can hold the colorant particles in concave parts thereof. The first substrate and the second substrate have such shapes that the first substrate and the second substrate are mated each other. Therefore, the convex parts can fiction as the spacer member, and the first substrate and the second substrate can be fixed without adhesion. Thus, the image displaying medium can be manufactured by a simple process.

Furthermore, after coating the colorant particles by the manner described above, an alternating current may be applied from electrodes arranged above and under the substrate, so as to flow the colorant particles, whereby the interior of the cells is uniformly coated.

BRIEF DESCRIPTION OF THE DRAWINGS

Preferred embodiments of the present invention will be described in detail based on the following figures, wherein:

FIGS. 23A to 23D are schematic cross sectional views showing an image displaying medium relating to the eleventh embodiment of the invention;

FIG. 24 is a diagram showing a manufacturing line of the twelfth embodiment of the invention;

FIG. 25 is a schematic cross sectional view showing an image displaying medium relating to the twelfth embodiment of the invention;

DETAILED DESCRIPTION OF THE PREFERRED EMBODIMENTS

The invention will be described in more detail with reference to the following specific embodiments, in which the following image displaying media an manufactured by the method for manufacturing an image displaying medium of the invention, i.e., a displaying medium having plural cells, in which two kinds of particles having different colors and characteristics, such as conductive black particles and insulating white particles, are filled; a displaying medium having plural cells, in which conductive white particles and insulating black particles are filled; a displaying medium having plural cells, in which insulating black particles and insulating white particles are filled; and a displaying medium having plural cells, in which plural kinds of colorant particles are filled.

(First Embodiment)

Figure 1:
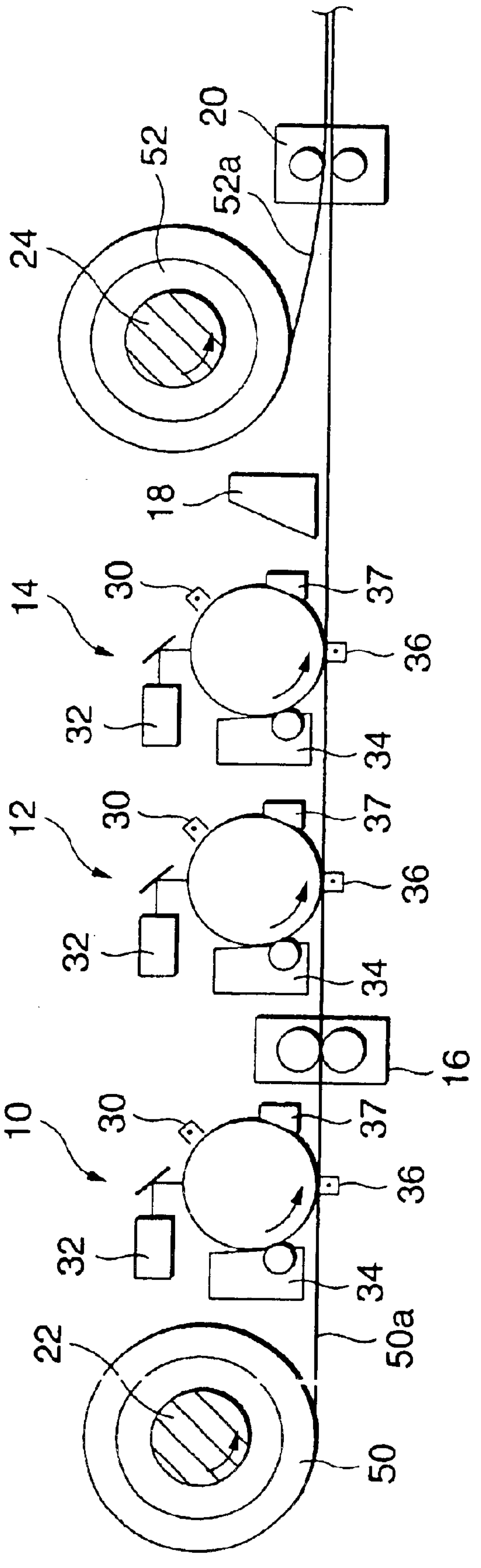
FIG. 1 is a diagram showing a manufacturing line of the first embodiment of the invention.

In the first embodiment of the invention, as shown in FIG. 1, by using a manufacturing line having, as roughly classified, a first electrostatic coating device 10, a second electrostatic coating device 12, a third electrostatic coating device 14, a first fixing device 16, a blade 18, a second fixing device 20, a first roller shaft 22 and a second roller shaft 24, spacer particles 60 and the particles of two colors are electrostatically coated on a first flat substrate 50*a* by an electrophotographic method, and a second flat substrate 52*a* is adhered thereto.

A first film roller 50 and a second film roller 52 are formed, for example, with PET (polyethylene terephthalate) and each is a flat substrate having a thickness of 50 $\mu$m wound into a roll form. The first film roller 50 is set on the first roller shaft 22, and the second film roller 52 is set on the second roller shaft 24, from which ends of the substrates are withdrawn and the substrates are supplied.

Between the first roller shaft 22 and the second roller shaft 24, the first electrostatic coating device 10, the first fixing device 16, the second electrostatic coating device 12, the third electrostatic coating device 14 and the blade 18 are arranged in this order from the side of the first roller shaft 22, and the first flat substrate supplied from the first film roller 50 passes through the first electrostatic coating device 10, the first fixing device 16, the second electrostatic coating device 12, the third electrostatic coating device 14 and the blade 18 in this order, and then superimposed on the second flat substrate supplied firm the second film roller 52, followed by fixing by the second fixing device 20.

The first electrostatic coating device 10 is for electrostatically providing spacer particles 60 on the first flat substrate 50*a* and has a structure containing a photoreceptor drum 31 having around it in this order a charger 30 for uniformly charging the photoreceptor drum 31, an optical writing device 32 for forming an electrostatic latent image having a lattice configuration on the photoreceptor drum 31, a developing device 34 for charging the spacer particles 60 to supply them to the photoreceptor drum 31, a corotron 36 for transferring the spacer particles 60 attached on the photoreceptor drum 31 to the first flat substrate 50*a* by applying an electric field, and a cleaner 37 for removing the spacer particles remaining on the surface of the photoreceptor drum 31.

Figure 2:
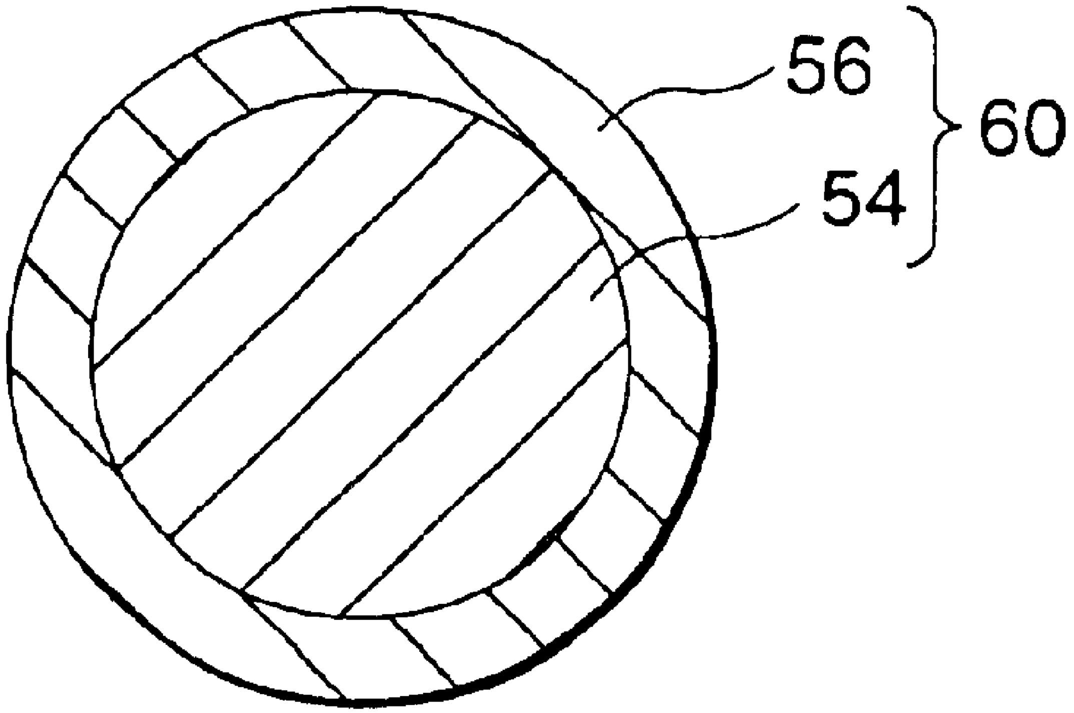
FIG. 2 is a cross sectional view of the spacer particle.

The spacer particles 60 each is a particle having a structure shown in FIG. 2, in which a thermoplastic resin layer 56 having a thickness of 10 $\mu$m is formed on the surface of a insulating particle 54 having an average particle diameter of 100 $\mu$m formed of a crosslinked copolymer containing divinylbenzene as a main component.

In the first elastic coating device 10, an electrostatic latent image of a lattice configuration having a lattice unit of 500 $\mu$m×500 $\mu$m is formed by the optical writing device 32 on the photoreceptor drum 31 uniformly charged by the charger 30, and the charged spacer particles 60 are supplied from the developing device 34 to arrange in the lattice configuration by adhering on the electrostatic latent image of the lattice configuration. When the spacer particles 60 arranged in the lattice configuration passes on the corotron 36, an electric field is applied to continuously transfer to the first flat substrate 50*a* transported between the photoreceptor drum 31 and the corotron 36.

On the downstream side of the photoreceptor drum 31, the first fixing device 16 is provided. The first fixing device 16 heats the first flat substrate 50*a*, on which the spacer particles 60 have been transferred. Thus, the thermoplastic resin layer 56 on the surface of the spacer particles 60 adhered on the surface of the first flat substrate 50*a* is fused, and a part thereof migrates to a gap between the insulating particles 54 and the first flat substrate 50*a*.

After passing through the first fixing device 16, the first flat substrate 50*a* is cooled in the air to fix the thermoplastic resin layer 56 and the first flat substrate 50*a*, and the spacer particles 60 are fixed on the first flat substrate 50*a*. Thus, the first flat substrate 50*a* becomes a substrate having convex spaces for maintaining the constant distance to the second flat substrate 52*a*.

After the first fixing device 16, the second electrostatic coating device 12 is provided. The second electrostatic coating device 12 has the same constitution as the first electrostatic coating device 10, and the description thereof is omitted but the same symbols are attached.

In a developing device 34 of the second electrostatic coating device 12, for example, conductive black panicles 62, such as conductive black particles having a true spherical shape formed of amorphous carbon having an average particle diameter of 20 $\mu$m and a resistivity of about $10^{-2}$ $\Omega$·cm, are filled, and the conductive black particles 62 are charged and supplied to a photoreceptor drum 31. The conductive black particles 62 having a true spherical shape formed of amorphous carbon are obtained through carbonization by baking a thermosetting phenol resin.

An optical writing device 32 of the second electrostatic coating device 12 cues the entire surface by a charger 30. Therefore, the charged conductive black particles 62 having a true spherical shape supplied from the developing device 34 are uniformly attached on the entire surface of the photoreceptor drum 31, and are continuously transferred by the electric field applied on passing on the corotron 36 to the first flat substrate 50*a* trans between the photoreceptor drum 31 and a corotron 36.

Figure 3A:
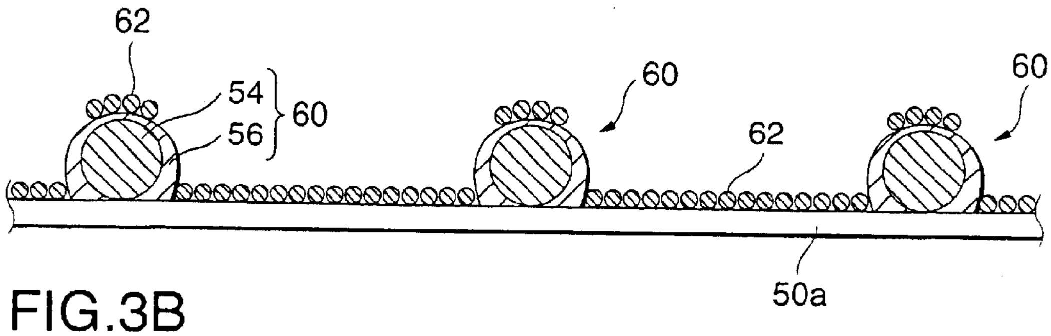
FIG. 3A is a diagram showing the state where the black particles are adhered.

Therefore, on the first flat substrate 50*a*, the conductive black particles 62 having a true spherical shape are attached on the entire surface including the upper surface of the spacer particles 60 as shown in FIG. 3A.

After the second electrostatic coating device 12, the third electrostatic coating device 14 is provided. The third electrostatic coating device 14 has the same constitution as the first electrostatic coating device 10, and the description thereof is omitted but the same symbols are attached.

In a developing device 34 of the third electrostatic coating device 14, for example, insulating white particles 64, such as particles having a true spherical shape formed of divinylbenzene as a main component having an average particle diameter of about 20 $\mu$m are filled, and the insulating white particles 64 are charged and supplied to a photoreceptor drum 31.

An optical writing device 32 of the third electrostatic coating device 14 charges in the same manner as in the optical writing device 32 of the second electrostatic coating device 12.

Therefore, the charged insulating white particles 64 supplied fan the developing device 34 are uniformly attached on the entire surface of the photoreceptor drum 31, and are continuously transferred by the electric field applied on passing on the corotron 36 to the first flat substrate 50*a* transported between the photo or drum 31 and a corotron 36.

Figure 3B:
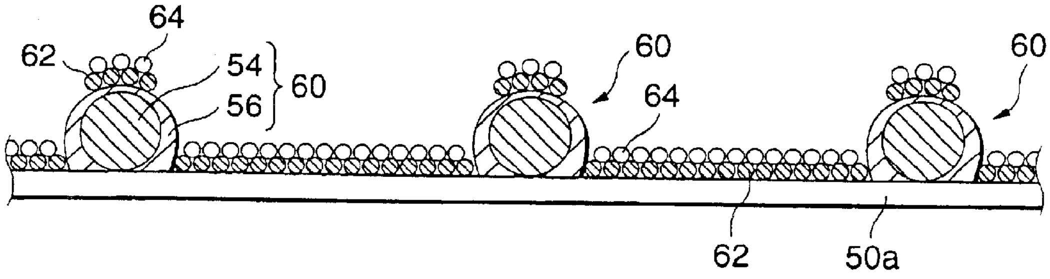
FIG. 3B is a diagram showing the state where the white particles are further adhered.

Therefore, on the first flat substrate 50*a*, the insulating white particles 64 is attached in the form of layer on the layer of the conductive black particles 62 having a true spherical shape attached on the entire surface including the upper surface of the spacer particles 60 as shown in FIG. 3B.

Figure 3C:
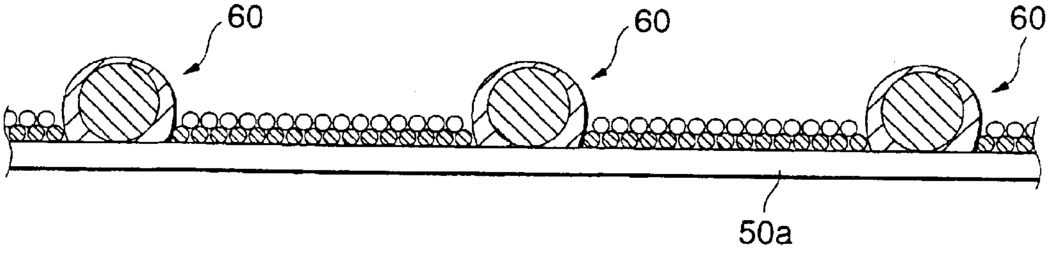
FIG. 3C is a diagram showing the state where the black particles and the white particles adhered on the upper surface of the spacer are removed.

After the third electrostatic coating device 14, the blade 18 is provided, and the blade device removes the conductive black particles 62 having a true spherical shape and the insulating white particles 64 attached on the upper surface of the spacer particles 60 by contacting the blade on the upper surface of the spacer particles 60. Accordingly, the conductive black particles 62 having a true spherical shape and the insulating white particles 64 are arranged in the region divided by the spacer particles 60 as shown in FIG. 3C.

The first flat substrate 50*a* passing through the blade 18 is superimposed on the second flat substrate 52*a* supplied from the second film roller 52, and then heated by the second fixing device 20. Thus, the thermoplastic resin layer 56 of the spacer particles 60 is fused. After passing through the second fixing device 20, since the fused thermoplastic resin is solidified by cooling in the air, the thermoplastic resin layer 56 on the upper surface of the spacer particles 60 is fixed on the second flat substrate 52*a*, and the upper surface part of the spacer particles 60 and the second flat substrate 52*a* are fixed.

Figure 3D:
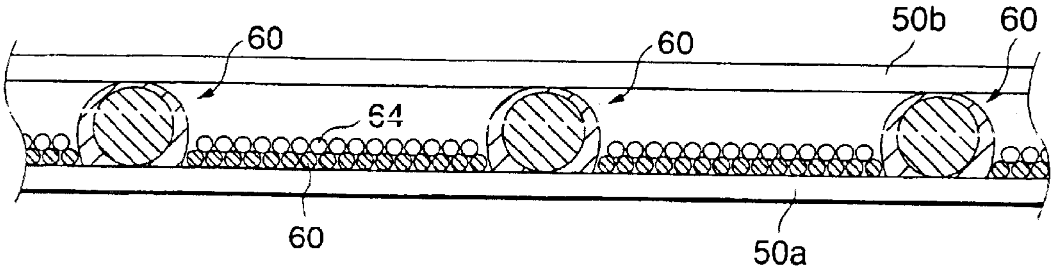
FIG. 3D is a cross sectional view showing the schematic structure of the resulting image display medium.

Accordingly, an image displaying medium having the first flat substrate 50*a* and the second flat substrate 52*a* facing each other having the colorant particles in a powder form uniformly filled therebetween can be manufactured as shown in FIG. 3D.

As the combination of the first flat substrate 50*a* and the second flat substrate 52*a* for constituting the image displaying medium, a film having a two-layer so in which an electrode layer having a thickness of about 50 μm is formed on a film made with a charge transporting material can be used.

By using the substrate having such a constitution, the colorant particles are attached corresponding to the image data on the film made with the charge transporting material by applying an electric field from a hole transporting film, so as to display the image.

As another combination, for example, a combination of a flat substrate containing a glass substrate having plural ITO pixel electrodes and a flat substrate containing a glass substrate having an ITO electrode on the whole surface thereof can be used. In this case, a substrate having a charge transporting layer made with a charge transporting material formed on the surface of the ITO electrode is used. Thus, the black particles are attached corresponding to the image data by applying an electric field from the side of the flat substrate having the plural ITO pixel electrodes, so as to display the image.

As the charge transporting material, hole transporting films formed by the following manner can be employed. About 40% by weight of N-methylcarbazolediphenylhydrazone as a hole transporting material is added to a polyethylene resin and uniformly dispersed therein, which is formed in to a film having a thickness of about 50 μm, or in alternative, About 40% by weight of β,β-bis(methoxyphenyl)vinyldiphenylhydrazone as a hole transporting material is added to a polyethylene resin and uniformly dispersed there which is formed in to a film having a thickness of about 50 μm.

The spacer particles 60 used are insulating particles 54 having the thermoplastic resin layer 56 formed on the surface thereof.

In the first fixing device 16 and the second fixing device 20, the thermoplastic is softened by heating to fix the spacer particles. For example, in the case using the spacer particles 60 having the thermoplastic resin layer formed on the surface thereof, such a constitution is employed that the spacer particles are heated in the first fixing device 16 and the second fixing device 20, so as to fix the spacer particles 60 to the first flat substrate 50*a* and the second flat substrate 52*a*.

In the first electrostatic coating device 10, other devices for forming an electrostatic latent image, such as a pin electrode and an ion flow device, can be used instead of the optical writing device 32.

Figure 4:
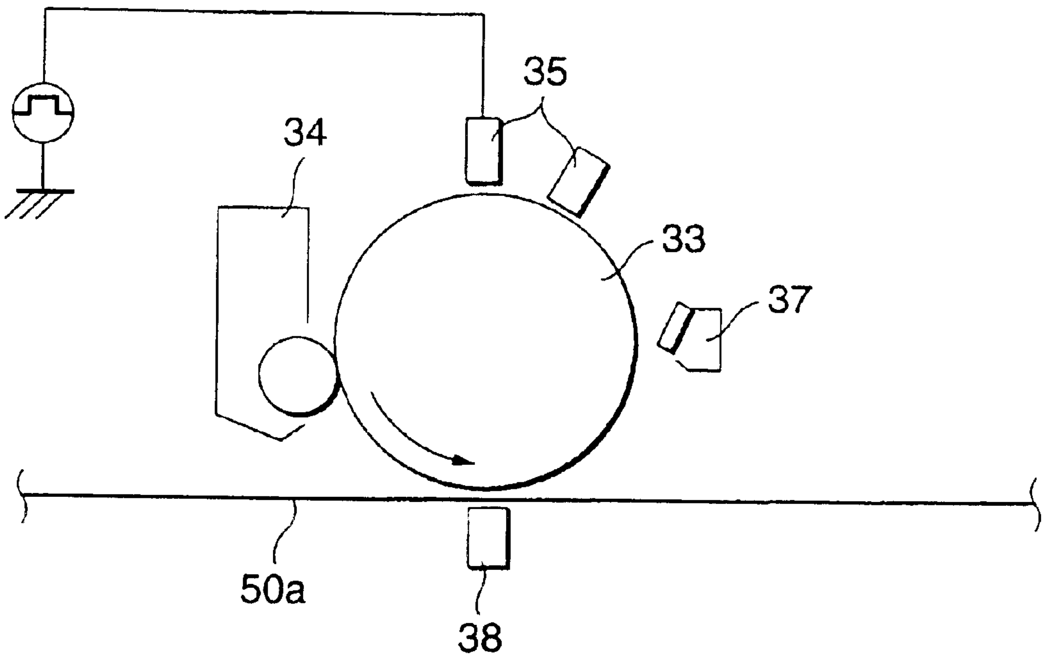
FIG. 4 is a schematic diagram showing one embodiment of the magnetic recording device.

Furthermore, when the spacer particles 60 are magnetic particles, the spacer particles 60 can be arranged in a lattice configuration on the first flat substrate 50*a* by a magnetic recording medium. On the manufacturing line in this case, a magnetic recording device, such as magnetography, is provided instead of the first electrostatic recording device 10. The magnetic recording device, for example, has a constitution shown in FIG. 4 containing a soft magnetic thin film drum 33 having around it in this order a magnetic writing device 35 for forming a lattice magnetic pattern on the surface of the soft magnetic thin film drum 33, a developing device 34 for supplying the spacer particles 60 to the soft magnetic thin film drum 33, a magnetism generator 38 for applying a magnetic field to transfer the spacer particles attached on the soft magnetic thin film drum 33 to the first flat substrate 50*a*, and a cleaner 37 for removing the spacer particles remaining on the soft magnetic thin film drum 33. The magnetic recording device is the same as the first electrostatic coating device 10 except that magnetism is utilized, and thus detailed description thereof is omitted.

Furthermore, it is also possible that a dispersion containing the spacer particles 60, die black particles 62 and the white particles 64 dispersed in a dispersion medium, and the dispersion is supplied from the developing device 34 to the photoreceptor drum 31 (i.e., liquid development).

(Second Embodiment)

Figure 5:
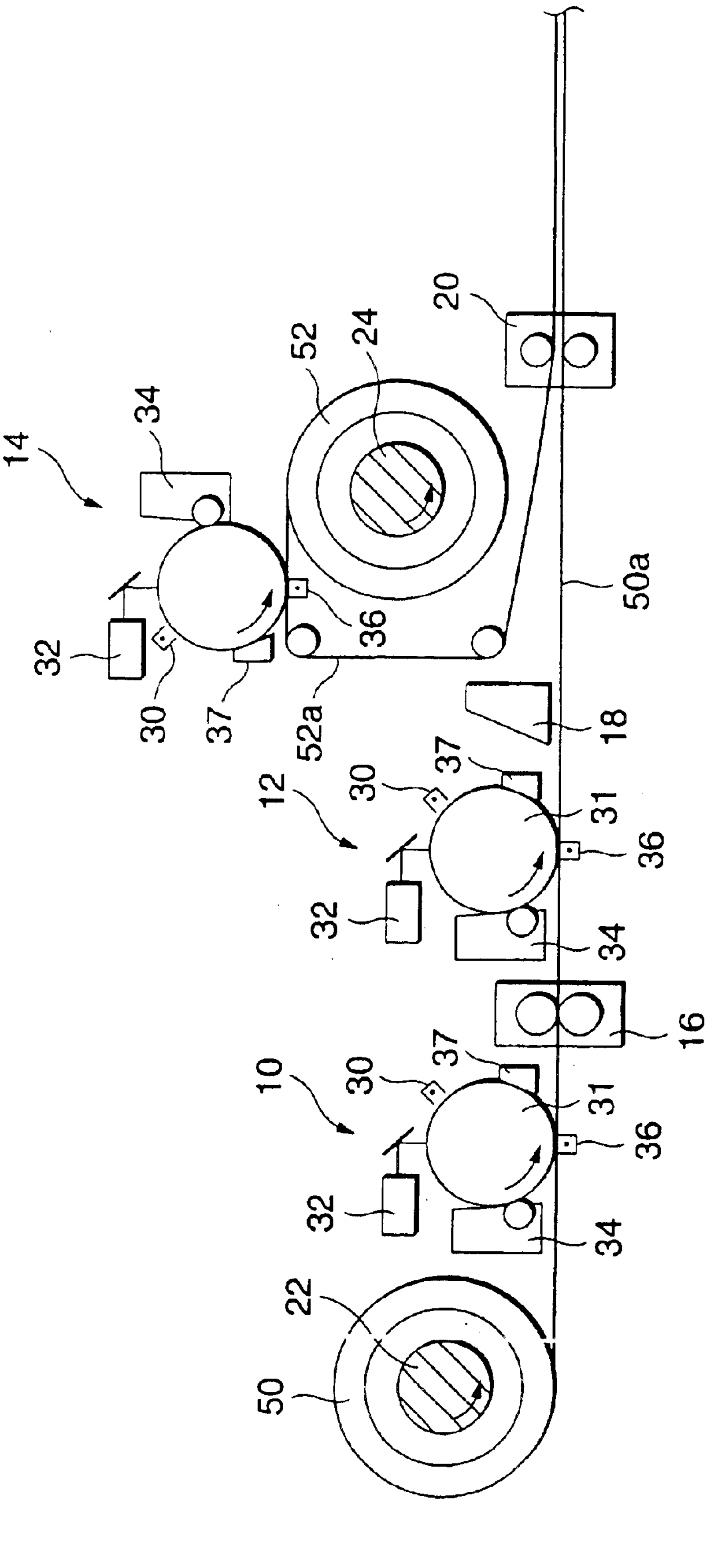
FIG. 5 a diagram showing a manufacturing line of the second embodiment of the invention.

The second embodiment is a modified example of the first embodiment. As shown in FIG. 5, between a first roller shaft 22 and a second roller shaft 24, a first electrostatic coating device 10, a first fixing device 16, a second electrostatic coating device 12 and a blade 18 are arranged from the side of the first roller shaft 22. After a spacer is formed on a first flat substrate 50*a* supplied from a first film roller 50 by the first electrostatic coating device 10 and the first fixing device 16, black particles 62 are attached on the entire surface by the second conductive coating device 12, and the black particles 62 attached on the upper surface of the spacer particles 60 is removed by the blade 18, followed by further transporting.

On the other hand a third electrostatic coating device 14 is provided on the side of a second flat substrate 52*a* supplied from a second film roller 52, white particles 64 are attached on the second flat substrate 52*a* by the third electrostatic coating device 14.

That is, in the second embodiment, after forming the spacer, the first flat substrate 50*a* having the black particles 62 attached on the surface thereof and the second flat substrate 52*a* having the white particles 64 attached are superimposed on each other, so as to arrange the black particles 62 and the white particles 64 between the substrates, and they are heated by the second fixing device 20, whereby the upper surface part of the spacer particles 60 and the second flat substrate 52*a* art fixed.

Accordingly, an image displaying medium containing the colorant particles in a powder form uniformly filed between the first flat substrate 50*a* and the second flat substrate 52*a* facing each other. According to the process, even in the case where the black particles 62 and the white particles 64 each are charged in the opposite polarity, they can be filled between the substrate without any problem. In the process, the white particles 64 are fixed in the condition where they arm sandwiched between the upper surface of the spacer particles 60 and the second flat substrate 52*a*, but the particles are hidden particles causing substantially no problem. The other constitutional components of the second embodiment are the same as in the first embodiment, and the detailed description thereof is omitted.

(Third Embodiment)

Figure 6:
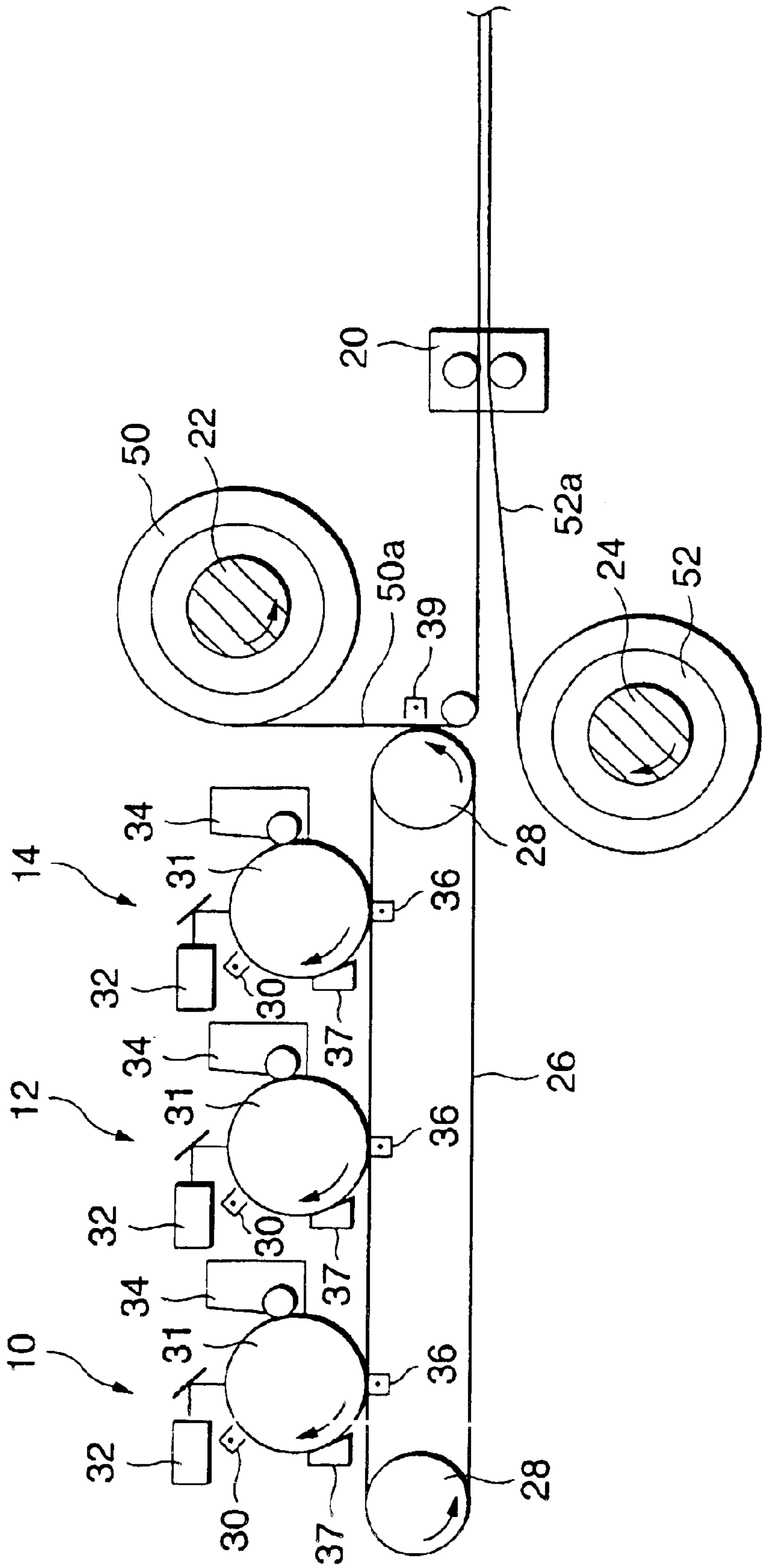
FIG. 6 is a diagram showing a manufacturing line of the third embodiment of the invention.

The third embodiment is a modified example of the first embodiment. As shown in FIG. 6, on an intermediate transfer material 26 in a endless belt form rotating on a pair of rotating rollers 28, a first electrostatic coating device 10, a second electrostatic coating device 12 and the third electrostatic coating device 14 are arranged in this order. Spacer particles 60, black particles 62 and white particles 64 are transferred to the intermediate transfer material, and the spacer particles 60, the black particles 62 and the white particles 64 are transferred at a tine from the intermediate transfer material to a first flat substrate 50*a* by a corotron 39. Thereafter, the first flat substrate 50*a* is superimposed on a second flat substrate 52*a*, and a thermoplastic resin layer 56 on the surface of the space particles 60 between the first flat substrate 50*a* and the second flat substrate 52*a* is fused to fix the first flat substrate 50*a* and the second flat substrate 52*a* through the spacer particles 60 at a time. According to the process, the only one fixing step is applied, and thus it is advantageous that the manufacturing method becomes simple. The other constitutional components of the third embodiment are the same as in the first embodiment, and the detailed description thereof is omitted.

(Fourth Embodiment)

Figure 7:
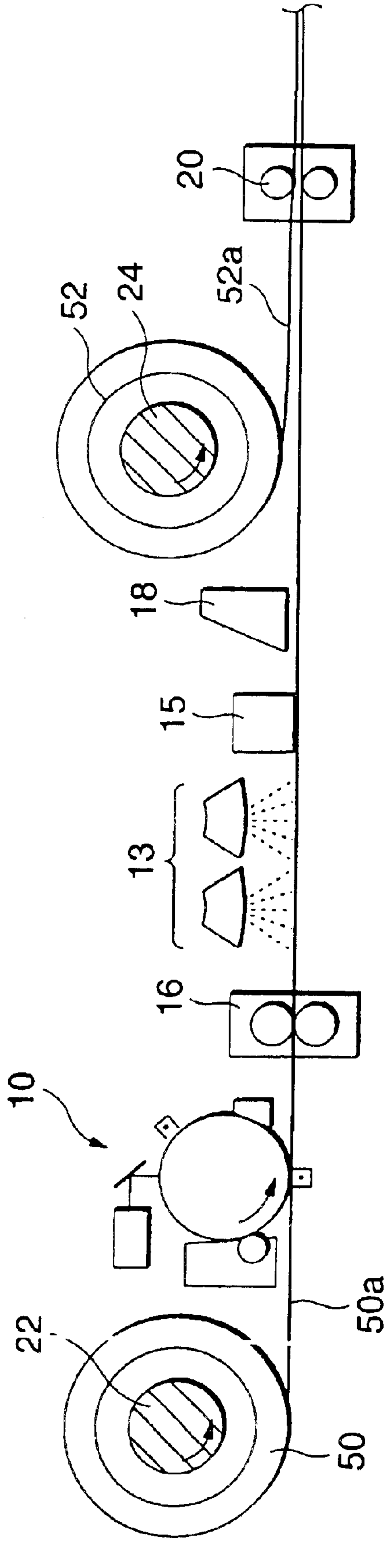
FIG. 7 is a diagram showing a manufacturing line of the fourth embodiment of the invention.

The fourth embodiment is a modified example of the first embodiment. As shown in FIG. 7, black particles 62 dispersed in a dispersion medium and white particles 64 dispersed in a dispersion medium each are sprayed on a first flat substrate 50*a* by spray coating devices 13 instead of the second electrostatic coating device 12 and the third electrostatic coating device 14, and then the dispersion media are dried by a drying device 15, so as to uniformly provide the black particles 62 and the white particles 64 on the first flat substrate 50*a*.

As the dispersion media for dispersing the black particles 62 and the white particles 64, a solvent having high volatility, such as an alcohol solution, e.g., an aqueous solution of isopropyl alcohol, can be used.

This method can also be applied to the second embodiment and the third embodiment. The method is advantageous since a uniform panicle layer can be conveniently formed on the substrate. The other constitutional components of the fourth embodiment art the same as in the first embodiment, and the detailed description thereof is omitted.

(Fifth Embodiment)

Figure 8:
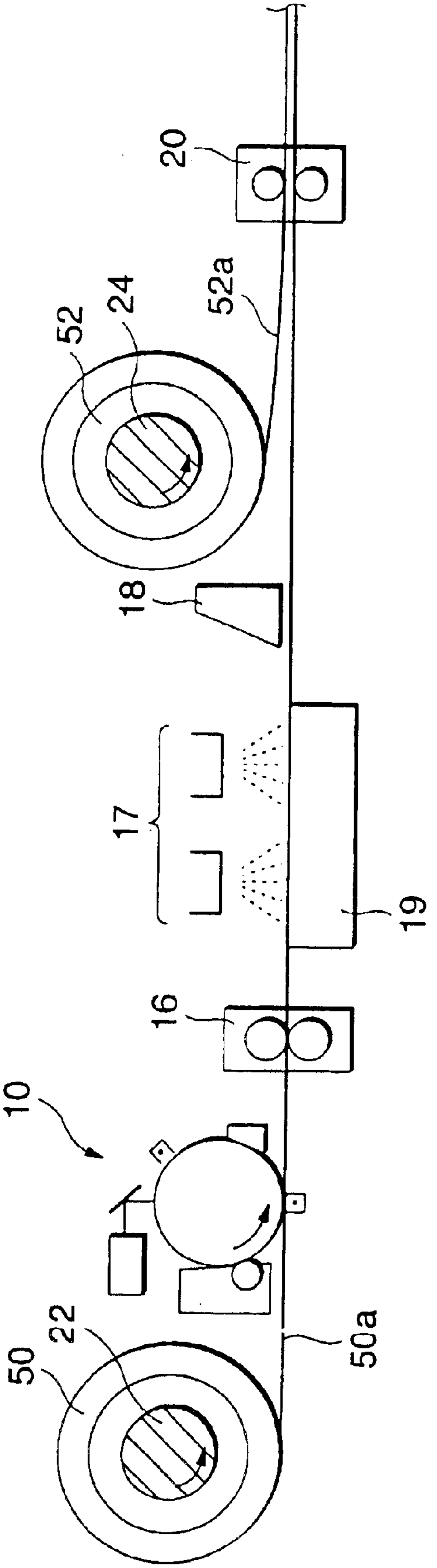
FIG. 8 is a diagram showing a manufacturing line of the fifth embodiment of the invention.

The fifth embodiment is a modified example of the first embodiment. As shown in FIG. 8, black particles 62 and white particles 64 each are dispersed on a first flat substrate 50*a* by powder dispersion devices 17 instead of the second electrostatic coating device 12 and the third electrostatic coating device 14, and then vibration is applied to the first flat substrate 50*a* by a vibrating device 19, so as to uniformly provide the black particles 62 and the white particles 64 on the first flat substrate 50*a*. This method can also be applied to the second edit and the third embodiment.

The method is advantageous since a uniform particle layer can be conveniently formed on the substrate. The other constitutional component of the fifth embodiment are the same as in the first embodiment, and the detailed description thereof is omitted.

(Sixth embodiment)

Figure 9:
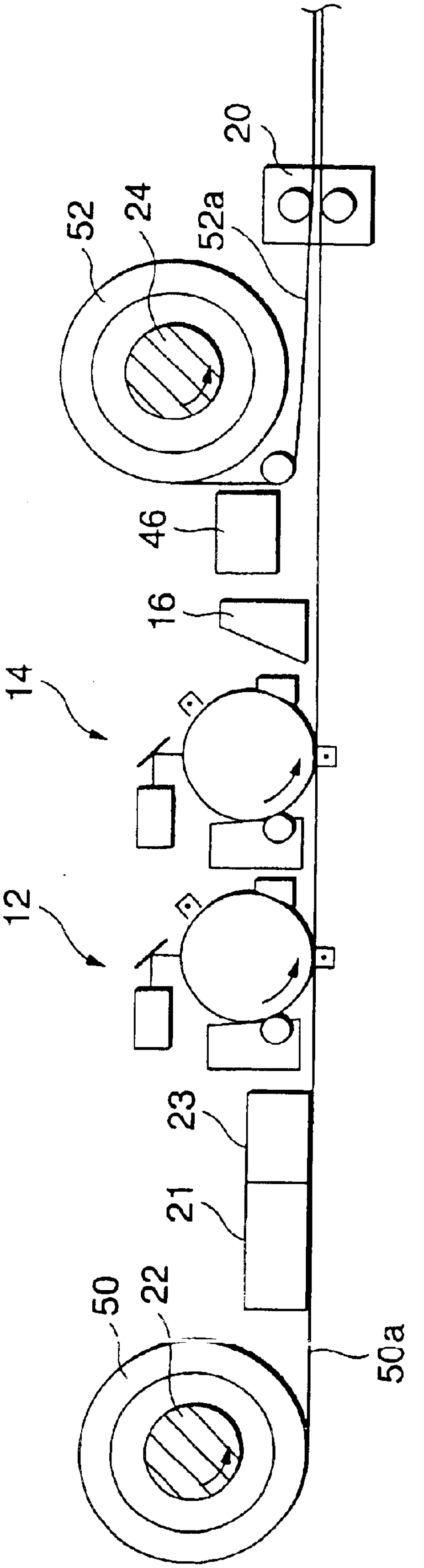
FIG. 9 is a diagram showing a manufacturing line of the sixth embodiment of the invention.

The sixth embodiment is a modified example of the first embodiment. As shown in FIG. 9, a screen printing device 21 and a heating device 23 are provided instead of the first electrostatic coating device 10.

The screen printing device 21 prints, for example, a thermosetting epoxy resin having insulating spacer particles having an average particle diameter of 100 μm dispersed therein on a first flat substrate 50*a*, for example, in a lattice configuration of a lattice unit of 500 μm×500 μm.

After the screen printing device 21, the heating device 23 is provided, which heats the thermosetting epoxy resin of the spacer particles printed on the surface of the substrate in the lattice configuration, so as to cure the thermosetting epoxy resin. Accordingly, the first flat substrate 50*a* becomes a substrate having a convex spacer for maintaining the constant distance to a second flat substrate 52*a*.

A thermosetting resin coating device 46 is provided on the second flat substrate 52*a* supplied from a second film roller 52, and a thermosetting resin is coated on the side of the second flat substrate 52*a*, on which the first flat substrate 50*a* is superimposed, to a thickness of about 10 μm by the thermosetting resin coating device 46.

Accordingly, when the substrates are heated by a heating device 20, the thermosetting resin coated on the second flat substrate 52*a* is cured, so as to fix the upper surface of the spacer particles 60 provided on the side of the first flat substrate 50*a* and the second fiat substrate 52*a*.

As the spacer particles that can be used in the screen printing device 21, for example, insulating particles 54 formed of a crosslinked copolymer containing, as a main component, divinylbenzene having an average particle diameter of 100 μm can be used. While the thermosetting epoxy resin is used as the dispersion medium of the spacer particles, it is not limited thereto, and other thermosetting resins and the action curing resins described in the foregoing can also be used.

As the spacer particles, those having the same constitution as in the first embodiment dispersed in a dispersion medium can be printed by the screen printing device 21. In this case, the thermosetting resin coating device 46 can be omitted.

The method for forming the spacer not only can be used in the first embodiment, but also can be used instead of the method where the spacer particles are directly fixed on the first flat substrate 50*a* as in the second embodiment, the fourth embodiment and the fifth embodiment (Seventh Embodiment)

Figure 10:
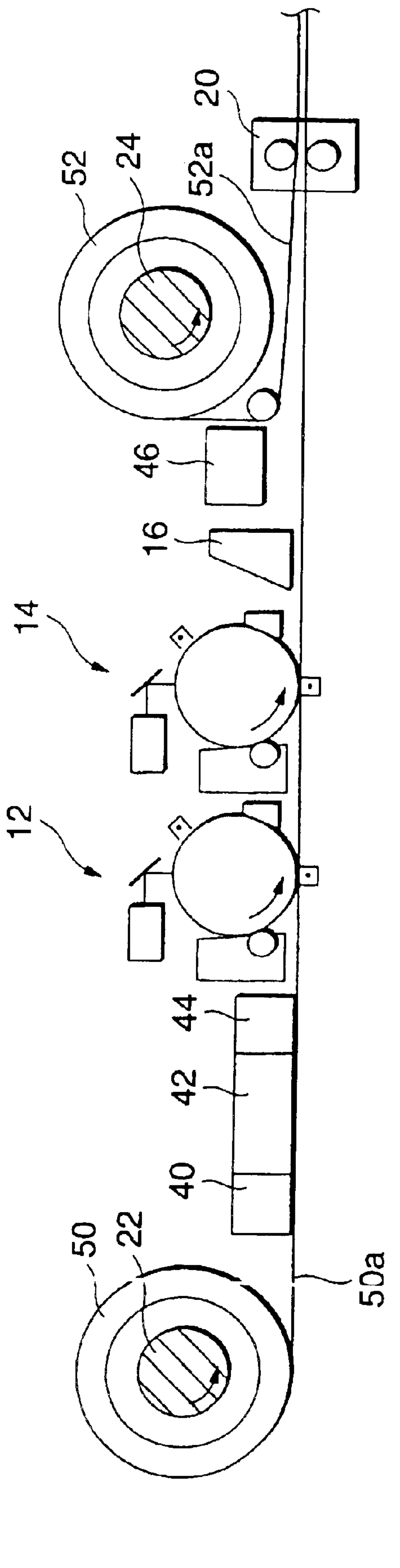
FIG. 10 is a diagram showing a manufacturing line of the seventh embodiment of the invention.

The seventh embodiment is a modified example of the sixth embodiment. As shown in FIG. 10, an ultraviolet ray curing rain coating device 40, an exposing device 42 and a unexposed resin removing device 44 are provided instead of the screen printing device 21 and the heating device 23.

That is, in the seventh embodiment, an ultraviolet ray curing resin layer is coated on a first flat substrate 50*a* to a thickness of about 100 μm by the ultraviolet ray curing resin coating device 40 and is exposed to a lattice configuration, in which lattice units of 100 μm×100 μm are divided by partitions having a width of 10 μm by the exposure device 42.

Thereafter, the ultraviolet ray curing resin on the non-exposure region is removed by the unexposed resin removing device 44, so as to form the first flat substrate 50*a* having a spacer of a lattice configuration having lattice units of 100 μm×100 μm formed on the surface thereof.

While the case using the ultraviolet ray curing resin is exemplified in the seventh embodiment other action curing resin such as an electron beam curing resin, can be used instead of the ultraviolet ray curing resin.

As similar to the sixth embodiment, this method for forming the spacer can be used instead of the method of fixing the spacer particles directly on the first flat substrate 50*a* as in the first embodiment, the second embodiment, the fourth embodiment and the fifth embodiment.

(Eighth Embodiment)

Figure 11:
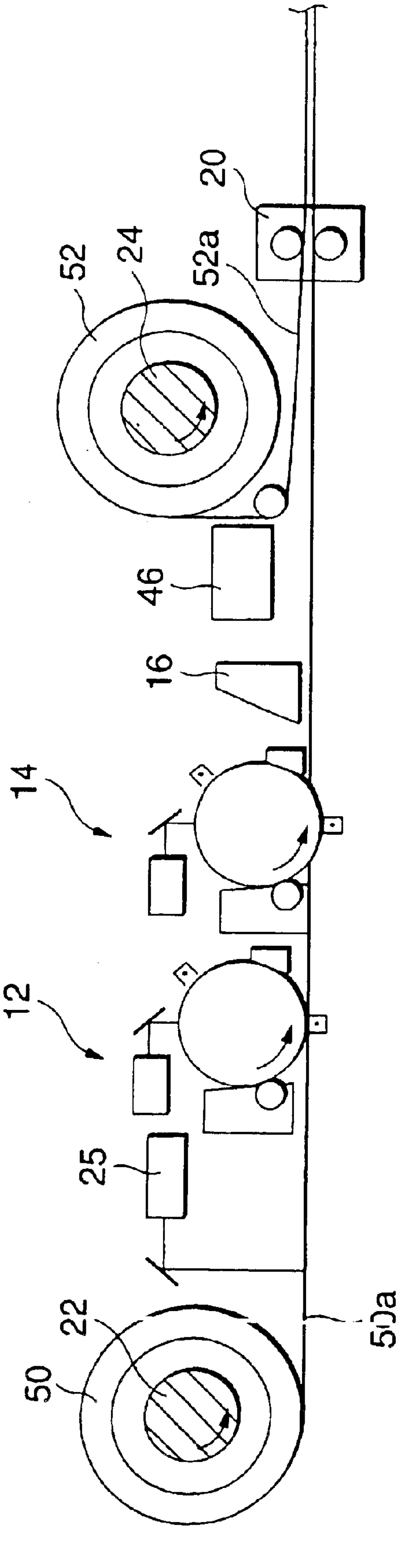
FIG. 11 is a diagram showing a manufacturing line of the eighth embodiment of the invention.

The eighth embodiment is a modified example of the sixth embodiment. As shown in FIG. 11, an abrasion device 25 is provided instead of the screen printing device 21 and the heating device 23.

The abrasion device 25 has an ultraviolet laser and abrades the surface of a first flat substrate 50*a* supplied from a film roller 50 to depth of about 100 μm by the ultraviolet laser to form a lattice having lattice units of 100 μm×100 μm divided by partitions having a width of 10 μm.

Accordingly, the first flat substrate 50*a* having on the surface thereof the spacer of a lattice configuration having lattice units of 100 μm×100 μm is obtained. The process is advantageous since the spacer can be conveniently formed with good precision.

In the eighth embodiment, because the surface of the first flat substrate 50*a* is abraded by the ultraviolet laser, the thickness of the first flat substrate 502 is determined with consideration of the thickness for forming the spacer. For example, a flat substrate formed of PET (polyethylene terephthalate) having a thickness of 150 μm wound to a roller is used as a first film roller 50.

As similar to the sixth embodiment, this method for forming the spacer can be used instead of the method of fixing the spacer particles directly on the first flu substrate 50*a* as in the first embodiment, the second embodiment, the fourth embodiment and the fifth embodiment.

(Ninth Embodiment)

The ninth embodiment is a modified example of the sixth embodiment, and a flat substrate 51*a* having a spacer is wound to a roll form, which is used as a fit film roller 51.

Figure 12:
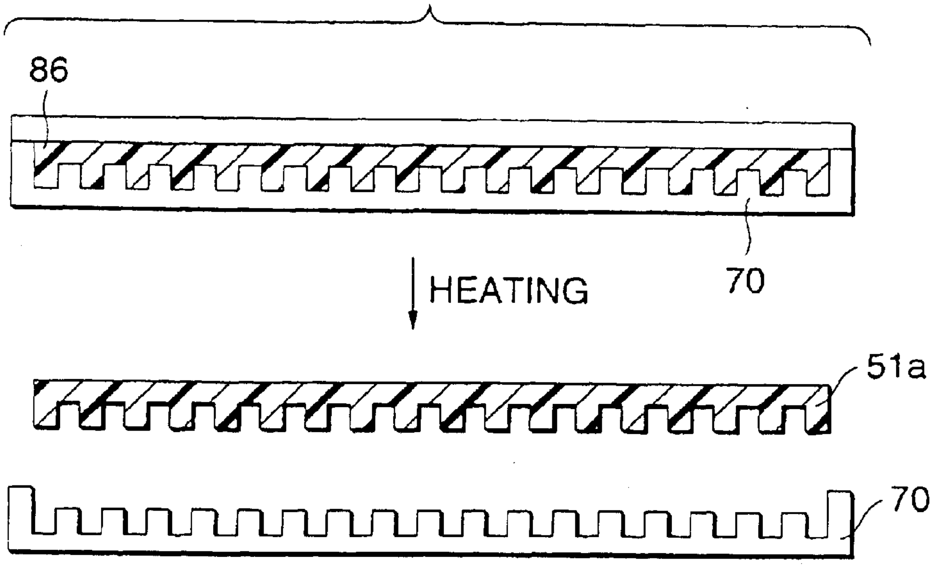
FIG. 12 is a diagram showing a method for forming a flat substrate having spacers.
Figure 13:
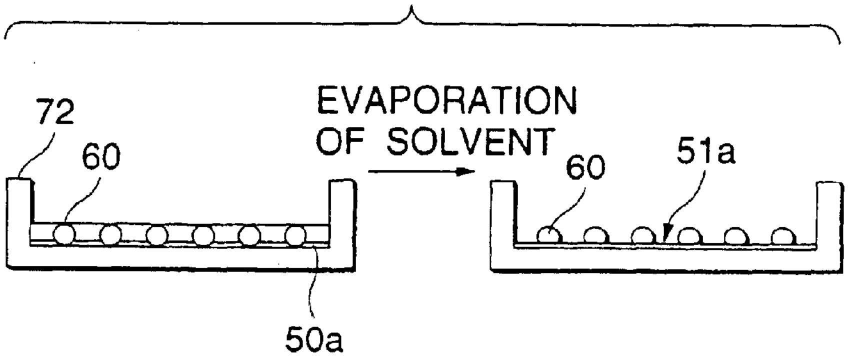
FIG. 13 is a diagram showing another method for forming a flat substrate having spacers.

The flat substrate 51*a* having a spacer can be formed by separately conducting the step of forming the spacer in the first to eighth embodiments, and may be formed in the following manners. For example, as shown in FIG. 12, a mold 70 having a lattice having lace units of 100 μm×100 μm and a depth of 100 μm divided by partitions having a width of 10 μm is manufactured by a discharge treatment, and after injecting a thermosetting resin or an action curing resin onto the mold, the substrate is formed by applying heat or an action, or in alternative, as shown in FIG. 13, a dispersion having spacer particles dispersed therein is put in a case 72 having a flat substrate 5*a* on the bottom surface thereof, followed by evaporating the solvent, so as to form the substrate.

In this case, the particles containing insulating particles 54 having a thermoplastic resin layer 56 (or an action curing resin layer) on the surface thereof as described in the first embodiment are used as the spacer particles, and heat or the corresponding action is applied after evaporating the solvent, so as to fix the spacer particles on the flat substrate.

Figure 14:
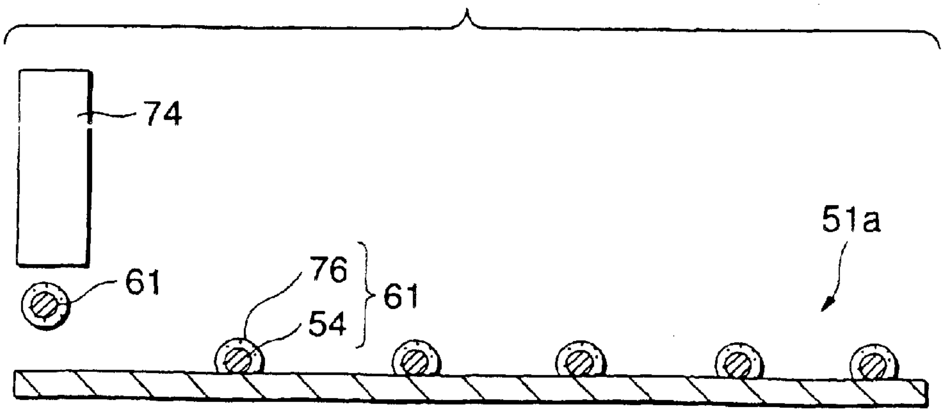
FIG. 14 is a diagram showing a method for forming a flat substrate having spacers by using a liquid spraying device.

As another method the flat substrate 51*a* having a spacer can be formed by a method shown in FIG. 14, in which the insulating particles 54 described in the first embodiment am dispersed in a medium containing an adhesive which is discharged on the flat substrate to a lattice configuration by using a liquid spraying device, such as an ink jet recording device.

Figure 15:
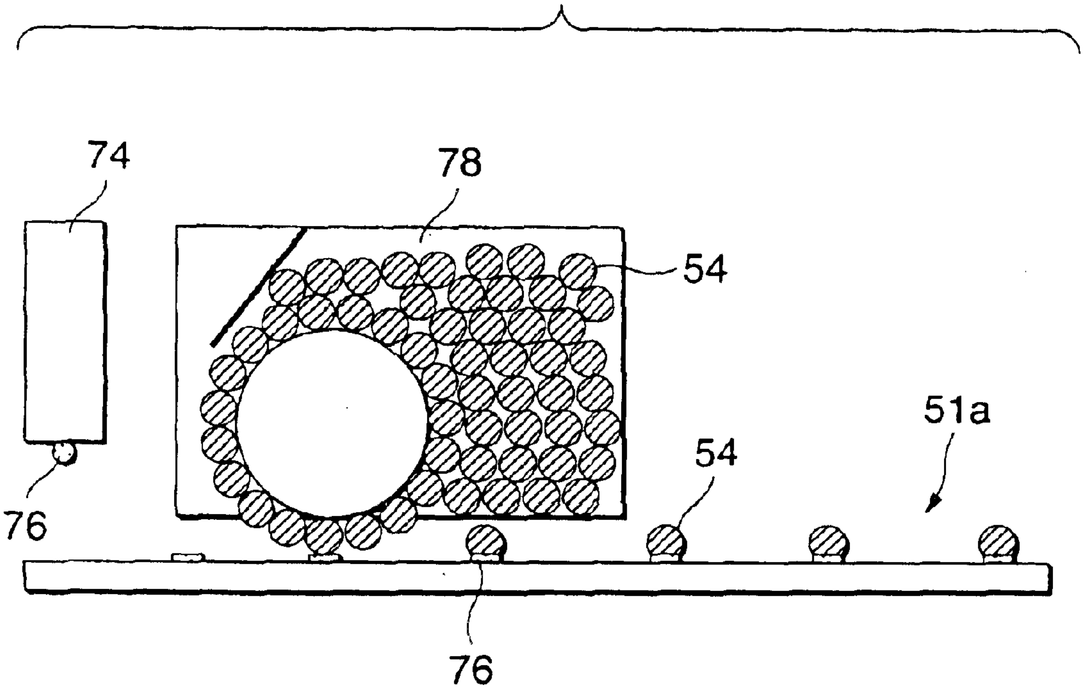
FIG. 15 is a diagram showing another method for forming a flat substrate having spacers by using a liquid spraying device.

As an application of the method, as shown in FIG. 15, after discharging an adhesive on a flat substrate to a lattice configuration by using a liquid spraying device, such as an ink jet recording device, insulating particles 54 are supplied on the flat substrate by a particle supplying device 78 to adhere the insulating particles 54 to the adhesive, whereby a flat substrate 51*a* having a spacer can be obtained.

Figure 16A:
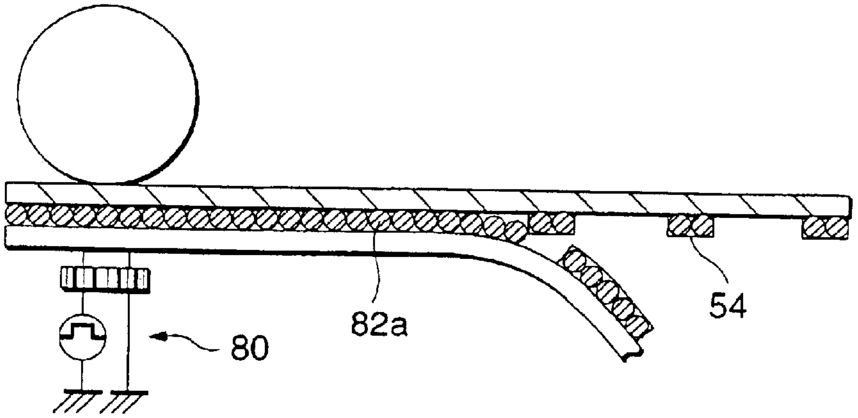
FIGS. 16A and 16B are diagrams showing a method for forming a flat substrate having spacers by using a thermal head.
Figure 16B:
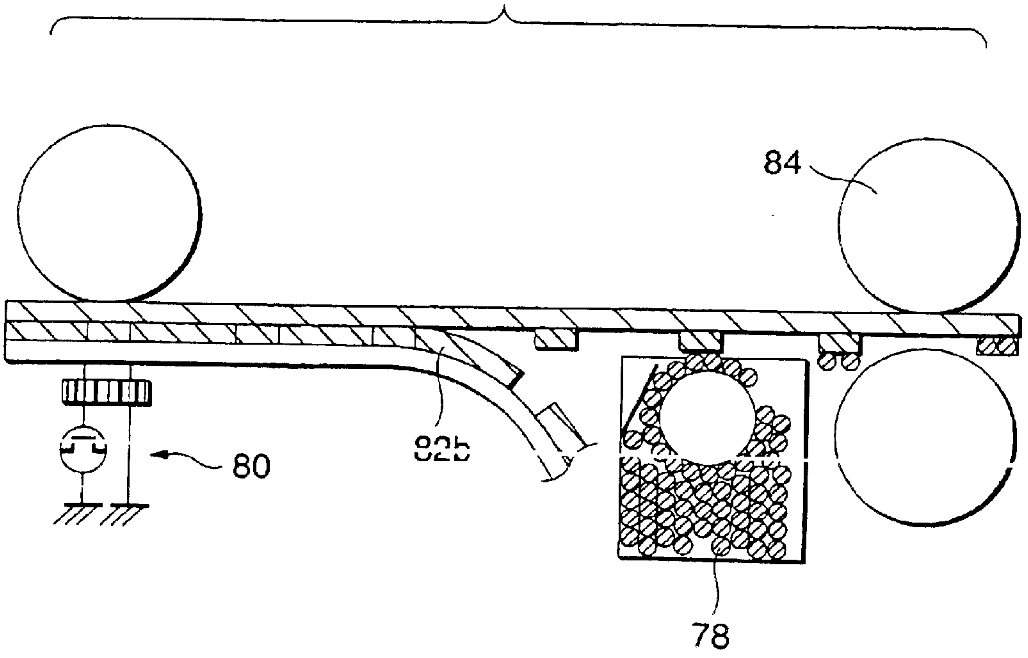

As further applications of the method, as shown in FIG. 16A, a solid transfer material, such as an ink ribbon 82 having insulating particles 54 described in the first embodiment dispersed therein, is softened by a thermal head 80 to transfer on a flat substrate to a lattice configuration, so as to form a flat substrate 51*a* having a spacer, or in alternative, as shown in FIG. 16B, after transferring solid transfer material such as an ink ribbon 82, to a flat substrate through softening by heating with a thermal head 80, insulating particles 54 are supplied to the flat substrate by a particle supplying device 78 until the ink is solidified, and the insulating particles 54 that are attached to the ink pattern are adhered by a pressing device to be compressed in the ink pattern, whereby a flat substrate 51*a* having a spacer can be formed.

Figure 17:
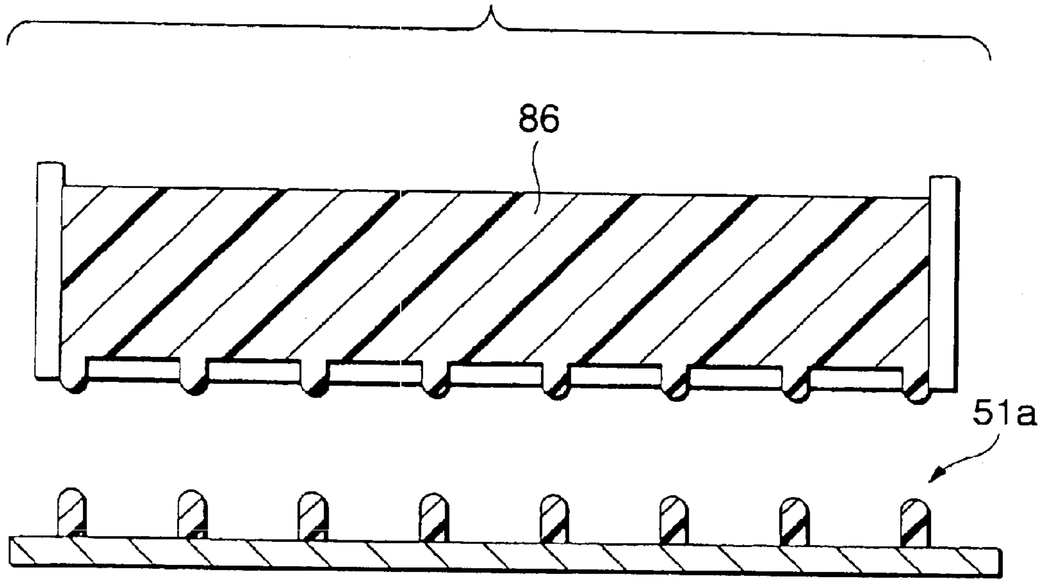
FIG. 17 is a diagram showing another method for forming a flat substrate having spacers.

Furthermore, as shown in FIG. 17, a resin 86 (for which those described in the foregoing can be used) in a flowing state is dropped on a flat substrate to form a lattice pattern and then solidified, so as to form 3 flat substrate 51*a* having a spacer.

Figure 18A:
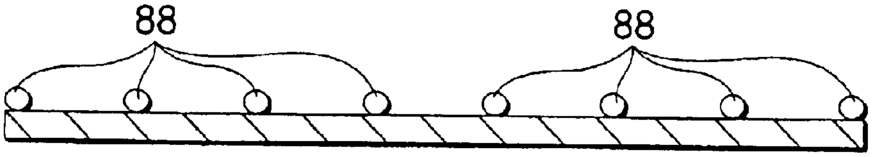
FIGS. 18A and 18B are diagrams showing a further method for forming a flat substrate having spacers.
Figure 18B:
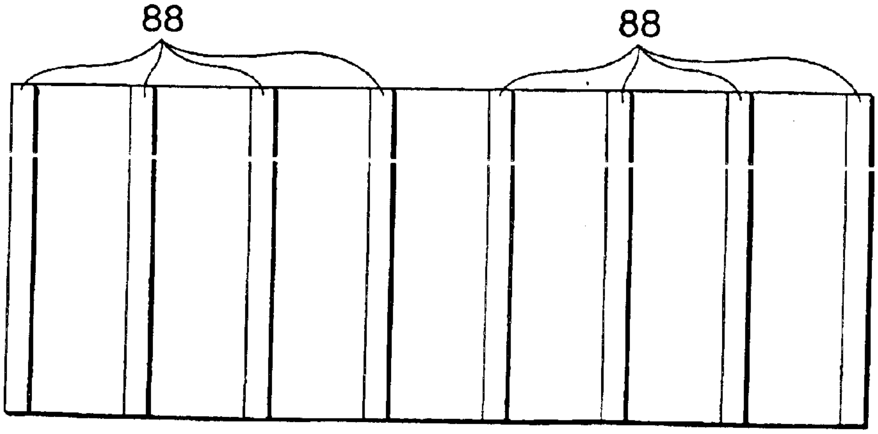

Furthermore, as shown in FIGS. 18A and 18B, bar spacer members having a thermoplastic resin layer or an action curing resin layer on the surface thereof, or bar spacer members formed of a thermoplastic resin or an action curing resin are arranged in parallel on a flat substrate, and they are fixed on the flat substrate by applying heat or the corresponding action, whereby a flat substrate 51*a* having a spacer can be formed.

Figure 19:
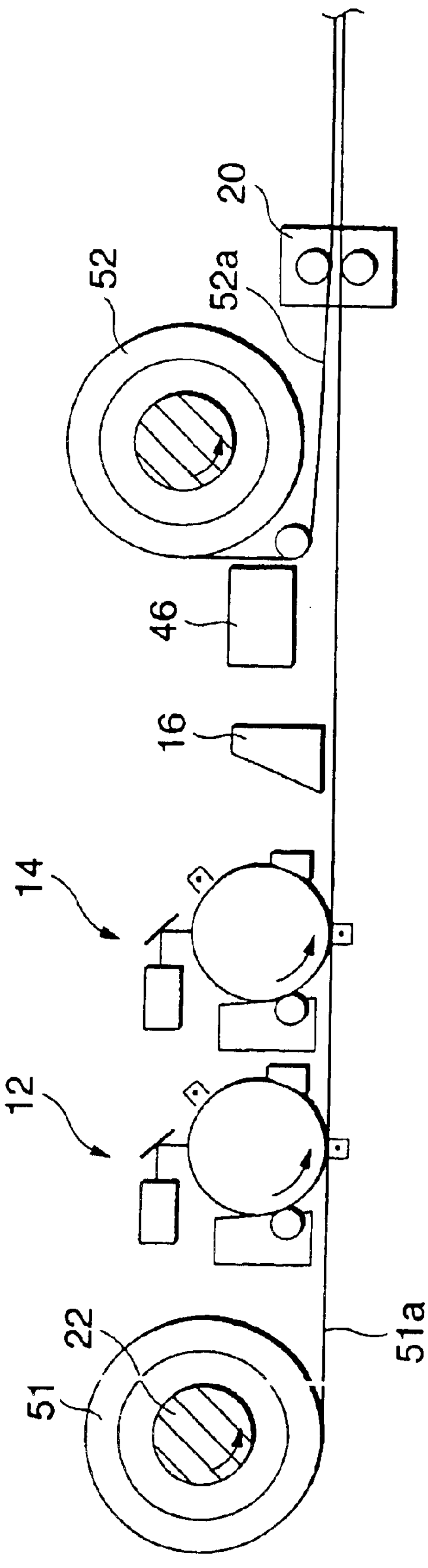
FIG. 19 is a diagram showing a manufacturing line of the ninth embodiment of the invention.
Figure 20:
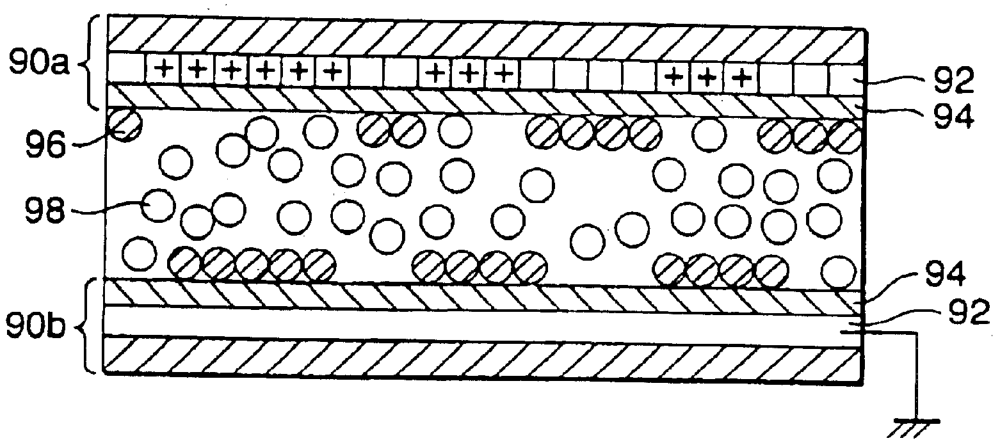
FIG.20 PRIOR ART
FIG. 20 is a cross sectional view showing the structure of conventional electronic paper.

The thus resulting flat substrate 51*a* having a spacer is wound into a roll form, which is set on a first roller shaft 22 in FIG. 19.

The manufacturing line shown in FIG. 19 is formed by removing the first electrostatic coating device 10 from the manufacturing line shown in the first embodiment, in which after uniformly coating the black particles 62 and the white particles 64 on the surface, the second flat substrate 52*a* is superimposed, to form an image displaying medium having the colorant particles in a powder form uniformly filled between the first flat substrate 51*a* and the second flat substrate 52*a*.

While the black particles 62 and the white particles 64 are supplied by an electrostatic recording method using an electrostatic recording device in the ninth embodiment, all the recording methods can be applied instead of the electrostatic recording method.

(Tenth Embodiment)

Figure 21:
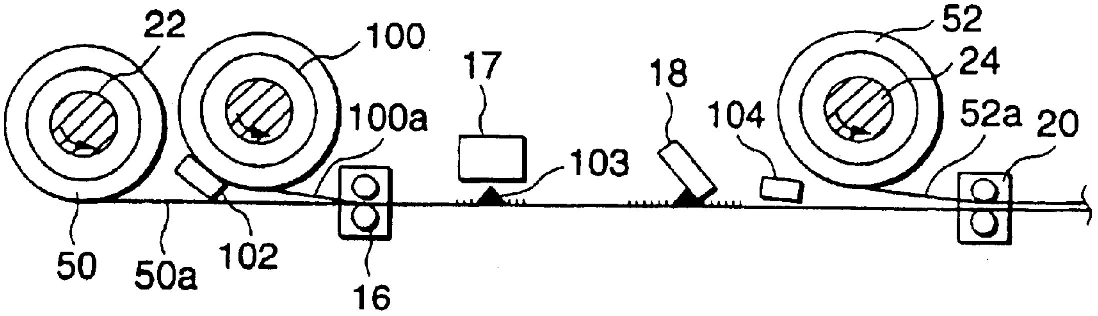
FIG. 21 is a diagram showing a manufacturing line of the tenth embodiment of the invention.

The tenth embodiment is a modified example of the fifth embodiment, and as shown in FIG. 21, instead of the first electrostatic coating device 10, a mesh member 100*a* supplied from a film roller 100 is adhered or fused by heating on a first flat substrate 50*a*, so as to form a spacer.

A transparent epoxy adhesive is coated by an adhesive coating device 102 on the first flat substrate 50*a* supplied from a film roller 50. The mesh member 10*a* supplied from the film roller 100 is adhered on the first flat substrate 50*a*. Then, after curing the adhesive by heating with a first fining device 16, colorant particles 103 are dispersed on the mesh member 100*a* by a powder dispersing device 17.

The dispersed colorant particles 103 are smoothened with a blade 18 to be coated on the mesh part of the mesh member 100*a*. At this time, the colorant particles 103 attached on the convex parts of the mesh member 100*a* are removed.

A second flat substrate 52*a* supplied from a film roller 52 is located with a transparent epoxy series adhesive by a second adhesive coating device 104, and then the first flat substrate 50*a* is superimposed thereto, followed by heating by a second fixing device 20, so as to curt the adhesive.

The colorant particles used heroin are formed by mixing white and black insulating particles, to which vibration is applied to electrostatically charge the particles.

Furthermore, the colorant particles 103 are fluidized by previously applying an AC voltage between electrodes provided above and under the particles to unravel the colorant particles 103 that are solidified and unmovable, so as to form a good coating condition of the colorant particles 103 excellent in uniformity and mobility.

By using the substrate of the constitution described herein, the colorant particles 103 are attached corresponding to the image data by applying an electric field, so as to display an image.

Figure 22:
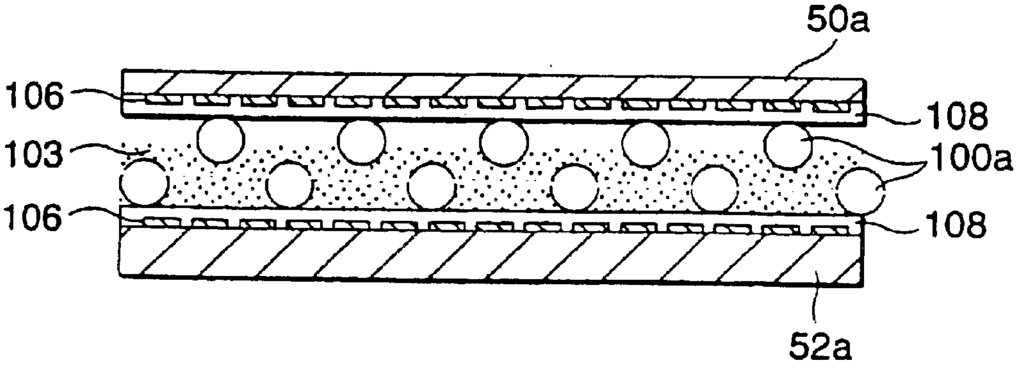
FIG. 22 is a schematic cross sectional view showing an image displaying medium relating to the tenth embodiment of the invention.

As another combination, a combination shown in FIG. 22 can be used, which contains a first flat substrate 50*a* formed of a glass substrate having plural ITO pixel electrodes 106 provided and a second flat substrate 52*a* formed of a glass substrate having plural ITO electrodes 106 provided on the entire surface thereof. In this case, a substrate having an insulating layer 108 formed of a dielectric material provided on the surface of the ITO pixel electrodes 106. Thus, the colorant particles 103 are adhered corresponding to the image data by applying an electric field from the side of the flat substrate having the plural ITO pixel electrodes 106 provided, so as to display an image.

Accordingly, a cell structure can be conveniently formed by using the mesh member as the spacer. Furthermore, it becomes possible to conveniently coat the colorant particles irrespective to the characteristics of the particles. It is also possible to coat plural kinds of particles mixed with each other.

(Eleventh Embodiment)

In the eleventh embodiment, electrodes of a band form are arranged on a substrate, and after mating a mold thereon, a resin is injected between the substrate and the mold to cure the resin, whereby the electrodes art fixed and an insulating film is formed on the substrate at a time.

On a first flat substrate 50*a* of 120 mm×120 mm formed of an acrylic substrate having a thickness of 5 mm, ITO-deposited PET films 110 (manufactured by Toray Corp.) having a band form of a width of 9 mm and a length of 120 mm are arranged as the ITO surface being upward with a distance of 1 mm as shown in FIG. 23A, and while holding the upper ends and the lower ends of the PET films, a transparent epoxy series adhesive 112 is coated on the arranged ITO electrodes as shown in FIG. 23B. Thereafter, the adhesive is cured by heating, and then the upper ends and the lower ends of the PET films are released to form electrodes.

Upon coating the transparent epoxy series adhesive 112, by mating with a mold 114 having arbitrary unevenness as shown in FIG. 23C, a spacer having arbitrary unevenness can be formed of the transparent epoxy series adhesive as shown in FIG. 23D.

Furthermore, the ITO-deposited PET films 110 are also arranged on a second flat substrate 52*a*, and after holding the upper ends and the lower ends of the PET films, the transparent epoxy series adhesive 112 is coated on the arranged ITO electrodes. Thereafter, the adhesive is cured by heating, and the upper ends and the lower ends are released to form electrodes. The coating step of the colorant particles 103 and the like steps are the same as those in the tenth embodiment, and the descriptions thereof are omitted. Thus, by using an adhesive, a cell structure having matrix electrodes can be conveniently formed. By using the substrate having such a constitution, the colorant particles 103 are adhered by applying an electric filed to display an image.

(Twelfth Embodiment)

In the twelfth embodiment, by using a dry screen coating device, only the colorant particles in a powder form are coated by screen printing using a mesh and a blade, in which the colorant particles can be coated only on the necessary regions by using a mask.

A desire electrode pattern is formed by etching on a first flat substrate 50*a* and a second flat substrate 52*a* each formed of a glass substrate having an ITO electrode vapor-deposited thereon, and a mask 116 is placed on the first flat substrate 50*a*, whereby the colorant particles 103 are not coated on the regions other than the necessary regions, as shown in FIG. 24.

Then, the colorant particles 103 are placed on the screen mesh by a dry screen coating device 118 and smoothened by a blade 18, so as to uniformly coat the colorant particles. Thereafter, the mask 116 is removed by a mask removing device not shown in the figure, and after placing a spacer member 120 having an epoxy series adhesive coated on both surfaces, the second flat substrate is superimposed and adhered. The other constitutional components of the twelfth embodiment are the same as those in the tenth embodiment, and thus the description thereof is omitted.

The first flat substrate 50*a* and the second flat substrate 52*a* each is a flat substrate having plural ITO pixel electrodes 106 thereon as shown in FIG. 25. In this case, a substrate having an insulating layer 108 formed of a dielectric material provided on the surface of the ITO electrodes 106. Thus, the colorant particles can be attached corresponding to the image data by applying an electric field from the side of the flat substrate, on which the plural ITO electrodes are provided, so as to display an image.

Accordingly, the colorant particles can be conveniently coated irrespective to the electric characteristics of the particles. Also, a plurality of particles can be mixed to be coated. Furthermore, by coating the coloring agent using a mask, the colorant particles can be prevented from being coated on unnecessary regions but the colorant particles 103 can be coated only on the necessary regions.

(Thirteenth Embodiment)

Figure 26:
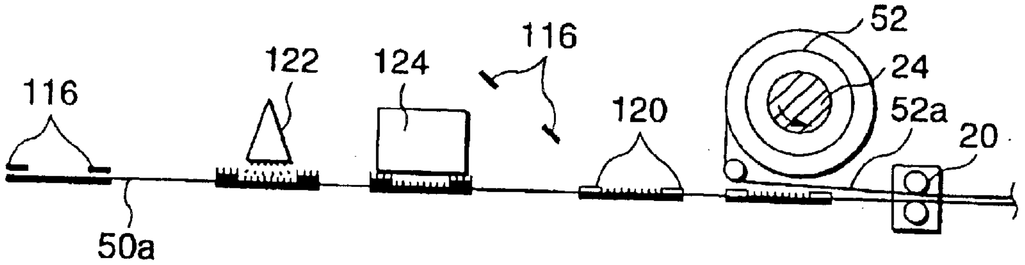
FIG. 26 is a diagram showing a manufacturing line of the thirteenth embodiment of the invention.

The thirteenth embodiment is a modified example of the twelfth embodiment. As shown in FIG. 26, a spray coating device (wet type) 122 is provided instead of the dry screen coating device 118.

The spray coating device 122 coats the colorant particles 103 dispersed in a dispersion medium is coated by spraying. Theater, after completely evaporating the dispersion medium by heating in a vacuum drying chamber 124 at 100° C. for 30 minutes, the mask 116 is removed by a mask removing device not shown in the figure, and a spacer member 120 having an epoxy series adhesive coated on both surfaces is put thereon, followed by adhering a second flat substrate 52*a*. The other constitutional components of the thirteenth embodiment are the same as those in twelfth embodiment, and the detailed description thereof is omitted.

(Fourteenth Embodiment)

Figure 27:
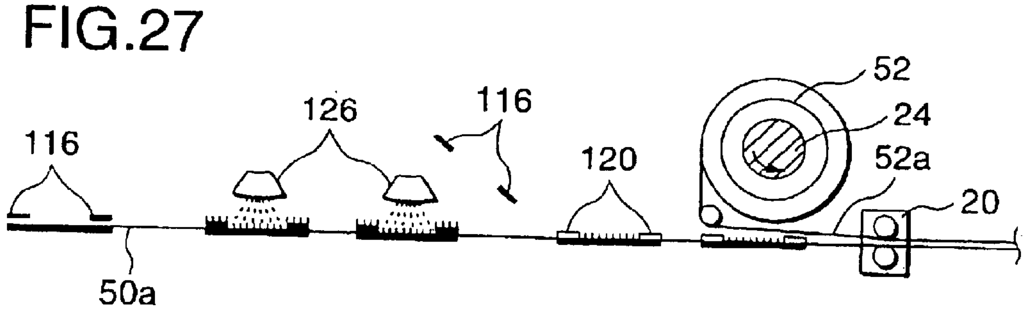
FIG. 27 is a diagram showing a manufacturing line of the fourteenth embodiment of the invention.

The fourteenth embodiment is a modified example of the thirteenth embodiment. As shown in FIG. 27, a powder spray coating device (dry type) 126 is provided instead of the spray coating device (wet type) 122, and the colorant particles of white and black are suspended in a closed space by air flow caused by splaying, and then made descending on the substrate.

By using the colorant particles descending, the particles can be uniformly coated. The coating amount can be precisely controlled by adjusting the time of descending. The other constitutional components of the fourteenth embodiment are the as those in thirteenth embodiment and the detailed description the thereof is omitted (Fifteenth Embodiment)

Figure 28:
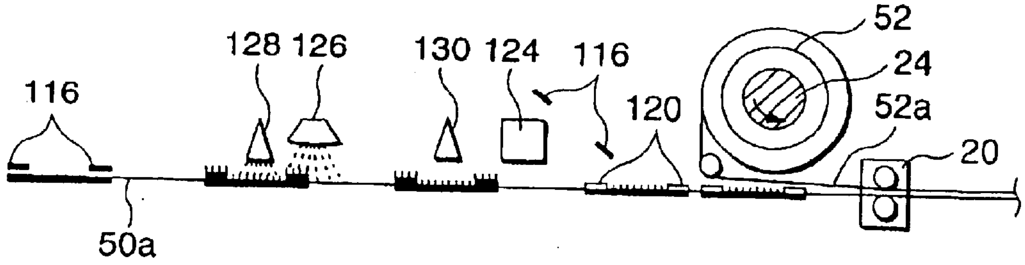
FIG. 28 is a diagram showing a manufacturing line of the fifteenth embodiment of the invention.
Figure 29:
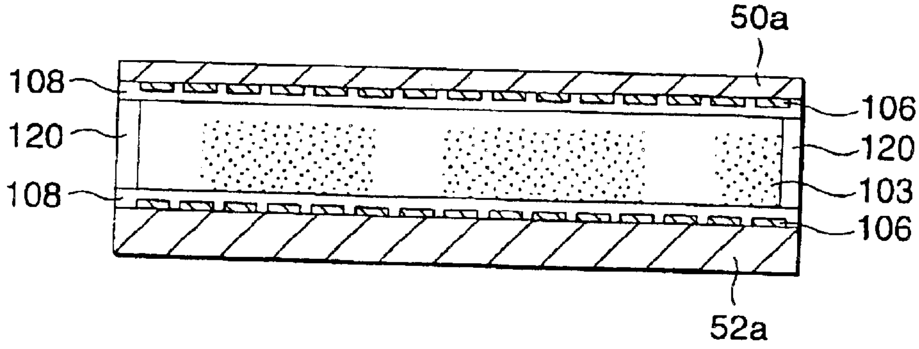
FIG. 29 is a schematic cross sectional view showing an image displaying medium relating to the fifteenth embodiment of the invention.

The fifteenth embodiment is a modified example of the fourteenth embodiment. As shown in FIG. 28, a liquid coating device 128 is provided for coating a volatile solvent, and a volatile solvent is previously coated by the liquid coating device 128. The colorant particles of white and black are spray-coated thereon by a dry spray device 126, to attach the particles on the part where the volatile liquid is coated. Thereafter, excess colorant particles are removed by air blowing using an air blow device 130. After completely evaporating the volatile solvent in a vacuum drying device 124 at 100° C. for 30 minutes, a spacer member 120 having an epoxy series adhesive coated on both surfaces is placed thereon, and a second flat substrate 52*a* is ad Accordingly, in a dry spray coating, after previously forming a pattern with the volatile solvent on the first flat substrate 50*a*, the excess colorant particles are removed by air blow, and then the volatile solvent is removed by drying, whereby the colorant particles can be coated only in the desire pattern. Thus, the substrate shown in FIG. 29 is manufactured. The other constitutional components of the fifteenth embodiment arm the same as those in fourteenth embodiment, and the detailed description thereof is omitted.

(Sixteenth Embodiment)

Figure 30:
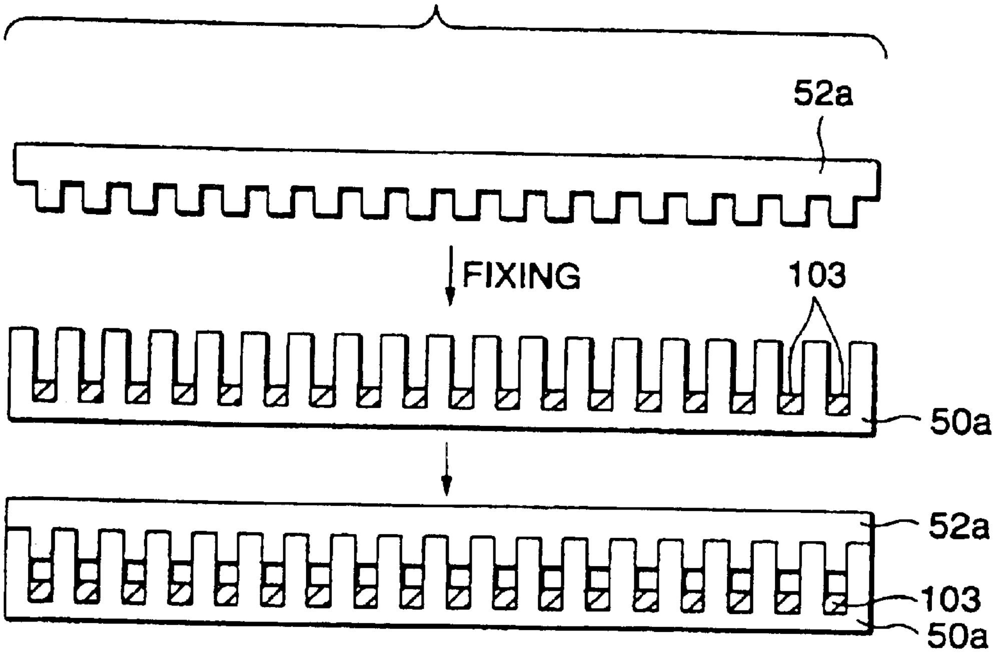
FIG. 30 is a schematic cross sectional view showing an image displaying medium relating to the sixteenth embodiment of the invention.

In the sixteenth embodiment, a first flat substrate 50*a* and a second flat substrate 52*a* are in the form shown in FIG. 30, i.e., they can be fixed to each other. They are manufactured by the following manner.

An arbitrary unevenness pattern is formed on a frat flat substrate 50*a* formed of an acrylic plate by a cutting machine, and an unevenness pattern that can be fixed to 52*a* by using a cutting machine. That is, the unevenness patterns arm formed in such a manner that the convex part of the first flat substrate 50*a* meets the concave part of the second flat substrate 52*a*, and the concave part of the first flat substrate 50*a* meets the convex part of the second flat substrate 52*a*. The unevenness pattern can be formed not only by cutting but also by using a mold, UV curing or laser abrasion.

Colorant particles 103 are dispersed on the unevenness pattern of the first flat substrate 50*a*. The dispersed colorant particles 103 are uniformly smoothened by a squeegee and coated in the concave parts of the unevenness pattern as shown in FIG. 30. Then, the unevenness pattern of the first substrate and the unevenness pattern of the second substrate are superimposed as shown in FIG. 30.

Accordingly, by fixing the first flat substrate 50*a* and the second flat substrate 52*a*, a step of adhering can be omitted to conveniently manufacture the image displaying medium (Seventeenth Embodiment)

Figure 31A:
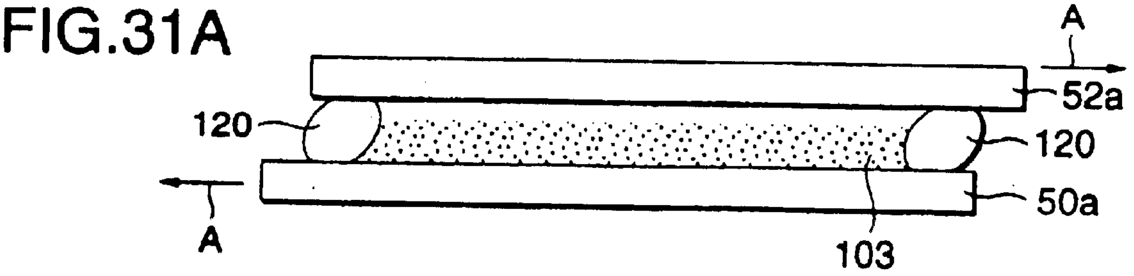
FIGS. 31A and 31B are schematic cross sectional views showing an image displaying medium relating to the seventeenth embodiment of the invention.
Figure 31B:
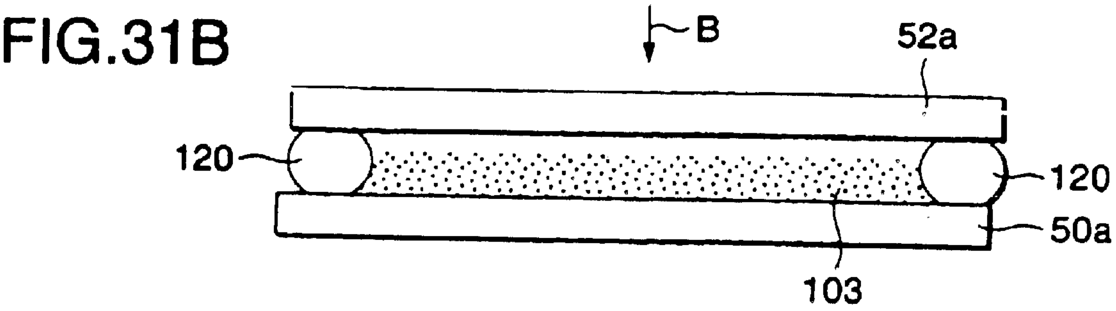
Figure 32A:
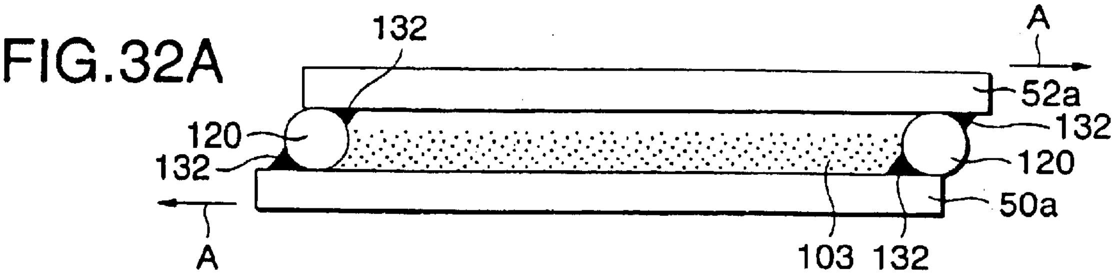
FIGS. 32A and 32B are schematic cross sectional views showing another image displaying medium relating to the seventeenth embodiment of the invention.
Figure 32B:
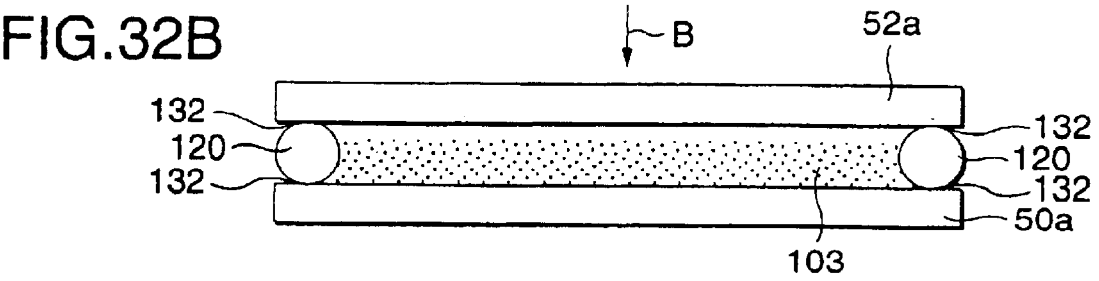

In the seventeenth embodiment, an elastic material is used as a spacer member 120 as shown in FIGS. 31A and 31B, or in alternative, an elastic material is used as an adhesive 132 for a spacer as shown in FIGS. 32A and 32B.

Upon using an elastic material as the spacer member 120, even when a force is applied in the horizontal direction (direction A in the figure) as shown in FIG. 31A, or even when a force is applied vertical direction (direction B in the figure) as shown in FIG. 31B, the spacer member 120 expands and contracts to prevent the adhesive from peeling.

Similarly, upon using an elastic material as the adhesive 132 for the spacer, even when a force is applied in the horizontal direction as shown in FIG. 32A, or even when a flee is applied vertical diction as shown in FIG. 32B, the adhesive 132 expands and contracts to prevent the adhesive from peeling.

In all the embodiments described in the foregoing, conductive particles and insulating particles can be used. The conductive particles can achieve charge transfer by contacting with the substrate and has an advantage that the charge can be stably maintained. Therefore, the use of conductive particles is preferred since the stability of the particles upon repeated use is improved. The insulating particles can have a charge distribution by friction with the particles of the same kind or with the particles of different kinds, which can be driven by an electric field.

Examples of a material that achieve charge transfer by contacting with the substrate include carbon black, metallic particles, such as nickel, silver, gold and tin, and particles having these materials coated thereon or contained therein.

Specifically, examples thereof include conductive particles having a true spherical form containing fine particles made with a crosslinked copolymer containing divinylbenzene as a main component having nickel electroless plating on the surface thereof (Micropearl NI, a trade name, manufactured by Sekisui Chemical Co., Ltd.), and conductive particles having a true spherical form further subjected to displacement plating with gold (Micropearl AU, a trade name, manufactured by Sekisui Chemical Co., Ltd.).

Furthermore, examples include conductive particles having a true spherical form of amorphous carbon obtained through carbonization by baking a thermosetting phenol resin (Univex GCP, H-Type, a trade name, manufactured by Unitika Ltd., volume resistivity: $\leqq 10^{-2}$ Ω·cm), conductive particles having a true spherical form further coated with a metal, such as gold and silver (Univex GCP Conductive Particles, a trade name, manufactured by Unitika Ltd., volume resistivity: $\leqq 10^{-4}$ Ω·cm), conductive particles having a true spherical form containing oxide fine particles having a true spherical form of silica or alumina having Ag and tin oxide coated on the surface thereof (Admafine, a trade name, manufactured by Admatechs Co., Ltd.), and particles containing mother particles of various materials, such as a styrene resin, an acrylic resin, a phenol resin, a silicone resin and glass, having conductive fine particles attached on the surface thereof or buried therein.

The insulating particles are not limited to those described in the foregoing, but the following materials can be used. The following materials can also be used in the embodiments described later.

Examples of the insulating white particles include crosslinked polymethyl methacrylate spherical fine particles containing titanium oxide (MBX-White manufactured by Sekisui Chemical Co., Ltd.), spherical particles of crosslinked polymethyl methacrylate (Chemisnow MX manufactured by Soken Chemical Co., Ltd.), fine particles of polytetrafluoroethylene (Lubron L manufactured by Daikin Industries. Ltd. and SST-2 manufactured by Shamrock Technologies Inc.), fine particles of carbon fluoride (CF-100 manufactured by Nippon Carbon Co., Ltd. and CFGL and CFGM manufactured by Daikin Industries, Ltd.), silicone resin fine particles (Tospearl manufactured by Toshiba Silicones Co. Ltd.), fine particles of polyester containing titanium oxide (Biryushia PL 1000 White T manufactured by Nippon Paint Co., Ltd.), fine particles of a polyester and acrylic resin containing titanium oxide (Conac No. 1800 White manufactured by NOF Corp.) and spherical fine particles of silica (Hipresica manufactured by UbeNitto Kasei Co., Ltd.).

Examples of the insulating black particles include particles having a true spherical form of a crosslinked copolymer containing divinylbenzene as a main component (Micropearl BB and Micropearl BBP manufactured by Sekisui Chemical Co., Ltd.) and spherical fine particles of crosslinked polymethyl methacrylate (MBX Black manufactured by Sekisui Plastics Co., Ltd.). Examples of the black conductive panicles include amorphous carbon fine particles formed by baking phenol rein particles (Univex GCP manufactured by Unitika Ltd.) and spherical fine particles of carbon and graphite (Nicabeads ICB, Nicabeads MC and Nicabeads PC manufactured by Nippon Carbon Co. Ltd.).

As described in the foregoing, the invention exhibits an effect that a display element in the form of powder can be uniformly filled between facing substrates.

What is claimed is:

1. A method for manufacturing an image displaying medium that displays an image by moving colorant particles in a gaseous medium, comprising:

first, providing plural colorant particles on at least one of a first flat substrate and a side of a second substrate on which a spacer is provided to maintain a distance to the first substrate upon superimposing on the first substrate; and second, fixing the first substrate and the spacer on the second substrate to arrange the colorant particles and a gaseous medium, within which the particles move, between the first substrate and the second substrate.

2. A method for manufacturing an image displaying medium as claimed in claim 1, wherein upon providing the colorant particles on the second substrate, the colorant particles provided on an upper surface of the spacer are removed.

3. A method for manufacturing an image displaying medium that displays an image by moving colorant particles in a gaseous medium, comprising:

first, providing plural colorant particles on one or both of a first flat substrate and a second flat substrate and providing a spacer member on one of the first substrate and the second substrate; and second, arranging the colorant particles, a gaseous medium, within which the particles move, and the spacer member between the first substrate and the second substrate by fixing the spacer member, the first substrate and the second substrate.

4. A method for manufacturing an image displaying medium as claimed in claim 3, wherein the plural colorant particles and the spacer member are transferred to an intermediate transfer material, and then transferred from the intermediate transfer material to the first substrate to be provided thereon.

5. A method for manufacturing an image displaying medium as claimed in claim 3, wherein the spacer has a mesh like configuration.

6. A method for manufacturing an image displaying medium as claimed in claim 3, wherein the spacer member or an adhesive for adhering the spacer member is made of an elastic material.

7. A method for manufacturing an image displaying medium as claimed in claim 3, wherein the spacer member is formed of a resin.

8. The method of claim 3, wherein no liquid is provided between the first substrate and the second substrate.

9. A method for manufacturing an image displaying medium that displays an image by moving colorant particles in a gaseous medium, comprising:

first, providing plural colorant particles on one or both of a first flat substrate and a second flat substrate while masking one of the first substrate and the second substrate;

second, after removing the mask, providing a spacer member on one of the first substrate and the second substrate; and third, fixing the spacer member, the first substrate and the second substrate so that the colorant particles, a gaseous medium, within which the particles move, and the spacer member are arranged between the first substrate and the second substrate.

10. A method for manufacturing an image displaying medium as claimed in claim 9, wherein the spacer has a mesh like configuration.

11. A method for manufacturing an image displaying medium as claimed in claim 9, wherein the spacer member or an adhesive for adhering the spacer member is made of an elastic material.

12. A method for manufacturing an image displaying medium as claimed in claim 9, wherein the spacer member is formed of a resin.

13. The method of claim 9, wherein no liquid is provided between the first substrate and the second substrate.

14. A method for manufacturing an image displaying medium as claimed in claim 1, wherein the spacer member has a mesh-like configuration.

15. A method for manufacturing an image displaying medium as claimed in claim 1, wherein the spacer member or an adhesive for adhering the spacer member is made of an elastic material.

16. A method for manufacturing an image displaying medium as claimed in claim 1, wherein the spacer member is formed of a resin.

17. The method of claim 1, wherein no liquid is provided between the first substrate and the second substrate.

18. A method for manufacturing an image displaying medium that displays an image by moving colorant particles in a gaseous medium, comprising:

first, providing plural colorant particles on one or both of a first flat substrate and a second flat substrate, which have such shapes that the first substrate and the second substrate are mated with each other; and second, mating the first flat substrate and the second flat substrate to capture the colorant particles and a gaseous medium, within which the particles move, between the first substrate and the second substrate.

19. The method of claim 18, wherein no liquid is provided between the first substrate and the second substrate.

20. A method for manufacturing an image displaying medium comprising the steps of:

providing a first substrate having plural spacers for defining an area;

positioning colorant particles into the defined area so that the colorant particles are freely movable within the defined area; and positioning a second substrate on to the spacers in order to seal the defined area.

21. A method for manufacturing an image displaying medium as claimed in claim 20, wherein positioning the colorant particles into the defined area comprises:

providing the colorant particles onto the first substrate having the plural spacers; and removing the colorant particles provided on an upper surface of the plural spacers.

22. A method for manufacturing an image displaying medium as claimed in claim 20, wherein the plural spacers are provided in a mesh-like configuration.

23. A method for manufacturing an image displaying medium as claimed in claim 20, wherein the plural spacers or an adhesive for adhering the plural spacer members is made of an elastic material.

24. A method for manufacturing an image displaying medium as claimed in claim 20 wherein the plural spacers are formed of a resin.

25. The method of claim 20, wherein no liquid is provided within the sealed defined area.

26. The method of claim 20, wherein positioning the second substrate on the spacers in order to seal the defined area comprises sealing a gaseous medium within the defined area, where the colorant particles move within the gaseous medium in the defined area.

* * * * *